(12) United States Patent
Skogsrud et al.

(10) Patent No.: US 10,611,024 B2
(45) Date of Patent: Apr. 7, 2020

(54) METHOD OF ITERATIVE MOTION CONTROL

(71) Applicant: Polarworks AS, Oslo (NO)

(72) Inventors: Simen Skogsrud, Oslo (NO); Thomas Boe-Wiegaard, Easton, CT (US)

(73) Assignee: Polarworks AS, Oslo (NO)

( * ) Notice: Subject to any disclaimer, the term of this patent is extended or adjusted under 35 U.S.C. 154(b) by 0 days.

(21) Appl. No.: 16/091,259

(22) PCT Filed: Apr. 26, 2017

(86) PCT No.: PCT/US2017/029712
§ 371 (c)(1),
(2) Date: Oct. 4, 2018

(87) PCT Pub. No.: WO2017/189771
PCT Pub. Date: Nov. 2, 2017

(65) Prior Publication Data
US 2019/0126474 A1 May 2, 2019

Related U.S. Application Data

(60) Provisional application No. 62/328,544, filed on Apr. 27, 2016.

(51) Int. Cl.
*G05B 19/04* (2006.01)
*G05B 19/18* (2006.01)
(Continued)

(52) U.S. Cl.
CPC ............ *B25J 9/1628* (2013.01); *B25J 9/1664* (2013.01); *G05B 13/04* (2013.01); *G05B 19/416* (2013.01);
(Continued)

(58) Field of Classification Search
CPC ........ B25J 9/126; B25J 9/1628; B25J 9/1664; G05B 13/04; G05B 19/416;
(Continued)

(56) References Cited

U.S. PATENT DOCUMENTS

| 2006/0229745 | A1* | 10/2006 | Ueda | G05B 19/416 |
| | | | | 700/63 |
| 2007/0038314 | A1* | 2/2007 | Cheng | G05B 19/416 |
| | | | | 700/63 |

(Continued)

*Primary Examiner* — Harry Y Oh
(74) *Attorney, Agent, or Firm* — Kim Rubin

(57) ABSTRACT

Described is a method and device of a computational motion engine iteratively computing a numerical "jerk," the motion derivative of acceleration, using real-time feedback from a system under motion control, to reach both a desired position and desired velocity of a next waypoint. Output from the motion engine is only desired acceleration, which is then passed to a motor driver, free of intermediate computations of either position or velocity. A second, inside feedback loop maintains desired acceleration or torque at the motor shaft based on the acceleration output of the motion engine, which may use non-linear correction tables. Waypoints comprising both position and velocity are inputs to the motion engine. Time to next waypoint is computed rather than provided as an input. Optimization of moves to the next waypoint is based on smoothest velocity change during the move. Embodiments include mechanical, two-axis SCARA arm motion systems.

20 Claims, 11 Drawing Sheets

(51) Int. Cl.
  *B25J 9/16* (2006.01)
  *G05B 19/416* (2006.01)
  *G05B 13/04* (2006.01)
  *B25J 9/12* (2006.01)

(52) U.S. Cl.
  CPC ..... *B25J 9/126* (2013.01); *G05B 2219/32404* (2013.01); *G05B 2219/42244* (2013.01); *G05B 2219/43065* (2013.01); *G05B 2219/49023* (2013.01)

(58) Field of Classification Search
  CPC ........... G05B 2219/32404; G05B 2219/42244; G05B 2219/43065; G05B 2219/49023
  See application file for complete search history.

(56) References Cited

U.S. PATENT DOCUMENTS

| | | | | |
|---|---|---|---|---|
| 2007/0250187 | A1* | 10/2007 | Heertjes | G05B 13/021 700/44 |
| 2010/0083936 | A1* | 4/2010 | Verdejo | B60K 6/485 123/406.65 |
| 2013/0197688 | A1* | 8/2013 | Egi | G05B 19/416 700/180 |
| 2013/0307459 | A1* | 11/2013 | Tian | G05B 19/25 318/570 |
| 2015/0012715 | A1* | 1/2015 | Aronovich | G06F 9/524 711/152 |
| 2015/0127155 | A1* | 5/2015 | Passot | B25J 9/163 700/257 |
| 2016/0080658 | A1* | 3/2016 | Tanaka | H04N 5/2328 348/369 |
| 2017/0282932 | A1* | 10/2017 | Tian | H02P 23/20 |

\* cited by examiner

PRIOR ART

Fig. 5

| | Next waypoint | | | | Initial state | | | | Method constants | | | | Iteration time interval | | |
|---|---|---|---|---|---|---|---|---|---|---|---|---|---|---|---|
| target pos | pt | 10.00 | mm | | position p0 | 0.00 | mm | | mult m1 | 6 | unitless | | interval ts | 0.23 | s |
| target vel | vt | 0.00 | mm/s | | velocity v0 | 0.00 | mm/s | | mult m2 | 4 | unitless | | | | |
| | | | | | accel a0 | 0.00 | mm/s^2 | | mult m3 | 3 | unitless | | | | |

Equation used to calculate iterative jerk for each iteration
$j = -(6*(4*p - 4*pt + a*(tt^2) + 3*tt*v + (tt)*vt))/(tt^3)$

| | Initial state inputs | | units |
|---|---|---|---|
| current pos | p | 0.00 | mm |
| current vel | v | 0.00 | mm/s |
| current acc | a | 0.00 | mm/s^2 |
| target pos | pt | 10.00 | mm |
| target vel | vt | 0.00 | mm/s |
| eta | tt | 3 | s |
| interval | ts | 0.23 | s |

| | Computed outputs | | |
|---|---|---|---|
| jerk | j | 8.89 | mm/s^3 |
| target acc | a next | 1.02 | mm/s^2 |

Fig. 6

| | | Iterations | | | | | | | | | | | | | Waypoint reached | |
|---|---|---|---|---|---|---|---|---|---|---|---|---|---|---|---|---|
| A | B | 0 | 1 | 2 | 3 | 4 | 5 | 6 | 7 | 8 | 9 | 10 | 11 | 12 | 13 |
| 26 | current pos p | 0.00 | 0.01 | 0.09 | 0.33 | 0.81 | 1.57 | 2.60 | 3.85 | 5.24 | 6.64 | 7.92 | 8.97 | 9.70 | 9.99 |
| 27 | current vel v | 0.00 | 0.12 | 0.59 | 1.48 | 2.66 | 3.92 | 5.06 | 5.87 | 6.20 | 5.97 | 5.17 | 3.91 | 2.40 | 0.18 |
| 28 | current acc a | 0.00 | 1.02 | 3.05 | 4.72 | 5.55 | 5.44 | 4.42 | 2.63 | 0.29 | -2.29 | -4.67 | -6.30 | -6.87 | -12.46 |
| 29 | target pos pt | 10.00 | 10.00 | 10.00 | 10.00 | 10.00 | 10.00 | 10.00 | 10.00 | 10.00 | 10.00 | 10.00 | 10.00 | 10.00 | 10.00 |
| 30 | target vel vt | 0.00 | 0.00 | 0.00 | 0.00 | 0.00 | 0.00 | 0.00 | 0.00 | 0.00 | 0.00 | 0.00 | 0.00 | 0.00 | 0.00 |
| 31 | eta tt | 3.00 | 2.77 | 2.54 | 2.31 | 2.08 | 1.85 | 1.62 | 1.39 | 1.16 | 0.93 | 0.70 | 0.47 | 0.24 | 0.01 |
| 32 | interval ts | 0.23 | 0.23 | 0.23 | 0.23 | 0.23 | 0.23 | 0.23 | 0.23 | 0.23 | 0.23 | 0.23 | 0.23 | 0.23 | 0.23 |
| 33 | Computed Ouputs | | | | | | | | | | | | | | |
| 34 | jerk j | 8.89 | 8.79 | 5.65 | 1.58 | -2.56 | -6.29 | -9.26 | -11.09 | -11.32 | -9.37 | -4.80 | -0.15 | -48.47 | |
| 35 | target acc a_next | 1.02 | 3.05 | 4.72 | 5.55 | 5.44 | 4.42 | 2.63 | 0.29 | -2.29 | -4.67 | -6.30 | -6.87 | -12.46 | |

Fig. 9

|    | A | B | C | D |
|----|---|---|---|---|
| 11 |   | initial state inputs |   | units |
| 12 | current pos | p | =G3 | mm |
| 13 | current vel | v | =G4 | mm/s |
| 14 | current acc | a | =G5 | mm/s^2 |
| 15 | target pos | pt | =C3 | mm |
| 16 | target vel | vt | =C4 | mm/s |
| 17 | eta | tt | 3 | s |
| 18 | interval | ts | =ts | s |
| 19 |   | Computed Outputs |   |   |
| 20 | jerk | j | =-(m1_*(m2_*C1)mm/s^3 |   |
| 21 | target acc | a next | =C14+(C20)/2 | mm/s^2 |
| 22 |   |   |   |   |
| 23 |   |   |   |   |
| 24 |   |   |   | iterations |
| 25 |   |   | 0 | 1 |
| 26 | current pos | p | =G3 | =C26+(D27+C27)*D32/2 |
| 27 | current vel | v | =G4 | =C27+(D28+C28)*D32/2 |
| 28 | current acc | a | =G5 | =C35 |
| 29 | target pos | pt | =C3 | =C29 |
| 30 | target vel | vt | =C4 | =C30 |
| 31 | eta | tt | =C17 | =C31-C32 |
| 32 | interval | ts | =C18 | =ts |
| 33 | Computed Ouputs |   |   |   |
| 34 | jerk | j |   | =-(m1_*(m2_*D26-m2_*D29+D28*(D31^2)+m3_*D31*D27+D31*D30))/(D31^3) |
| 35 | target acc | a next |   | =C35+(D34+C34)*D32/2 |

Fig. 10

| | A | B | C | D | units |
|---|---|---|---|---|---|
| 11 | Initial state inputs | | | | |
| 12 | current pos | p | 0.00 | mm | |
| 13 | current vel | v | 0.00 | mm/s | |
| 14 | current acc | a | 0.00 | mm/s^2 | |
| 15 | target pos | pt | 10.00 | mm | |
| 16 | target vel | vt | 10.00 | mm/s | |
| 17 | eta | tt | 3 | s | |
| 18 | interval | ts | 0.23 | s | |
| 19 | Computed outputs | | | | |
| 20 | jerk | j | 2.22 | mm/s^3 | |
| 21 | target acc | a next | 0.26 | mm/s^2 | |

| | A | B | C | D | E | F | G | H | I | J | K | L | M | N | O | P |
|---|---|---|---|---|---|---|---|---|---|---|---|---|---|---|---|---|
| 24 | | | | iterations | | | | | | | | | | | | Waypoint reached |
| 25 | | | | 0 | 1 | 2 | 3 | 4 | 5 | 6 | 7 | 8 | 9 | 10 | 11 | 12 | 13 |
| 26 | current pos | p | | 0.00 | 0.00 | 0.02 | 0.09 | 0.24 | 0.50 | 0.90 | 1.47 | 2.25 | 3.24 | 4.48 | 5.99 | 7.79 | 9.90 |
| 27 | current vel | v | | 0.00 | 0.03 | 0.16 | 0.42 | 0.84 | 1.41 | 2.10 | 2.91 | 3.82 | 4.84 | 5.94 | 7.15 | 8.48 | 9.90 |
| 28 | current acc | a | | 0.00 | 0.26 | 0.84 | 1.50 | 2.15 | 2.74 | 3.28 | 3.76 | 4.20 | 4.61 | 5.02 | 5.49 | 6.06 | 6.33 |
| 29 | target pos | pt | | 10.00 | 10.00 | 10.00 | 10.00 | 10.00 | 10.00 | 10.00 | 10.00 | 10.00 | 10.00 | 10.00 | 10.00 | 10.00 | 10.00 |
| 30 | target vel | vt | | 10.00 | 10.00 | 10.00 | 10.00 | 10.00 | 10.00 | 10.00 | 10.00 | 10.00 | 10.00 | 10.00 | 10.00 | 10.00 | 10.00 |
| 31 | eta | tt | | 3.00 | 2.77 | 2.54 | 2.31 | 2.08 | 1.85 | 1.62 | 1.39 | 1.16 | 0.93 | 0.70 | 0.47 | 0.24 | 0.01 |
| 32 | interval | ts | | 0.23 | 0.23 | 0.23 | 0.23 | 0.23 | 0.23 | 0.23 | 0.23 | 0.23 | 0.23 | 0.23 | 0.23 | 0.23 | 0.23 |
| 33 | Computed Ouputs | | | | | | | | | | | | | | | | |
| 34 | jerk | j | | 2.22 | 2.85 | 2.90 | 2.73 | 2.47 | 2.21 | 1.97 | 1.80 | 1.75 | 1.86 | 2.22 | 2.73 | -0.41 | |
| 35 | target acc | a next | | 0.26 | 0.84 | 1.50 | 2.15 | 2.74 | 3.28 | 3.76 | 4.20 | 4.61 | 5.02 | 5.49 | 6.06 | 6.33 | |

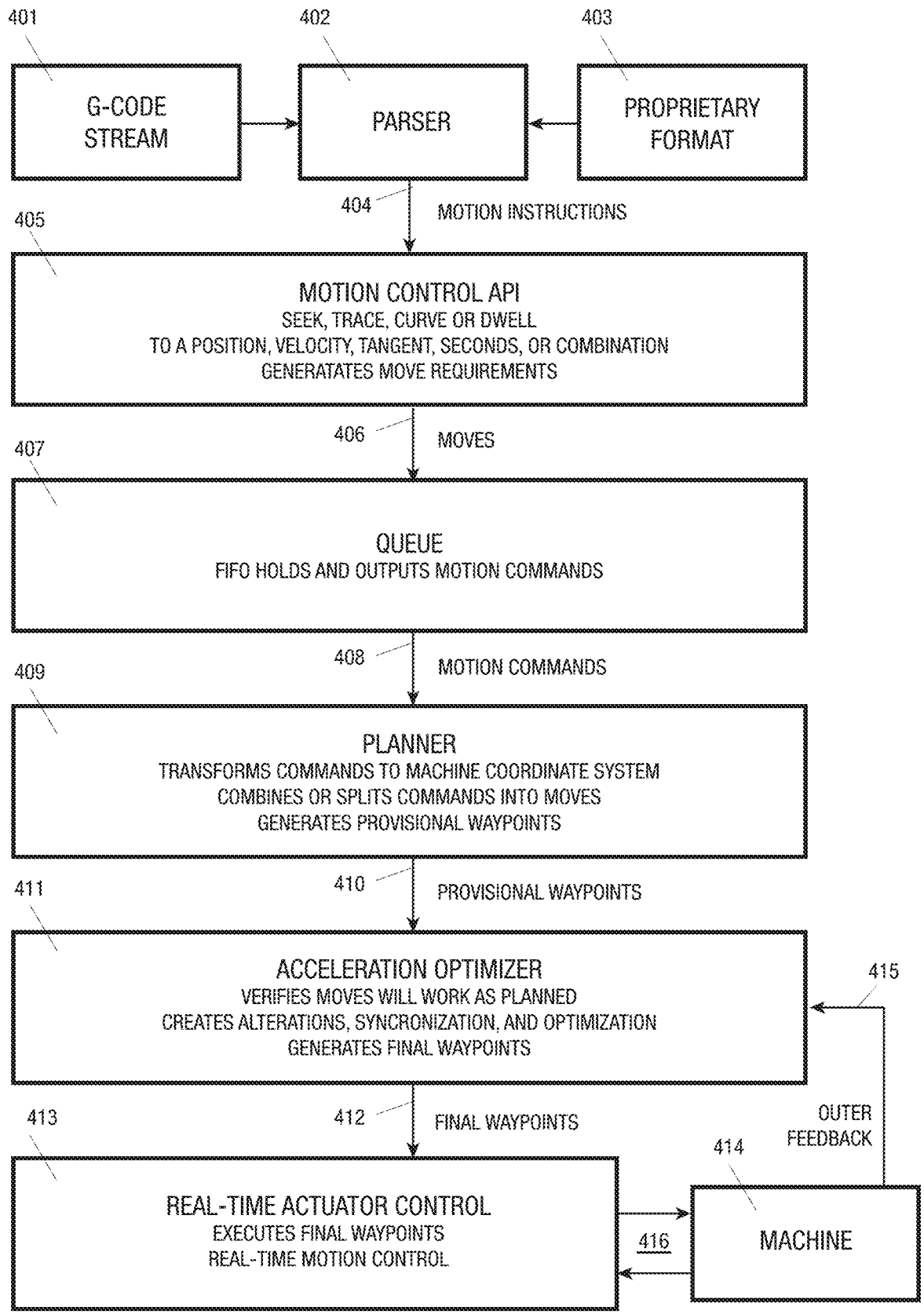

METHOD OF ITERATIVE MOTION CONTROL

This application claims priority to U.S. Provisional Application 62/328,544, filing date 27 Apr. 2016; prior art includes, U.S. Pat. No. 5,770,829A, "Katz"; U.S. Pat. No. 9,041,337B2, "Tian"; US20130197688A "Egi"; and U.S. Pat. No. 4,769,583A, "Goor".

BACKGROUND OF THE INVENTION

The field of this invention is machines for the purpose of moving an object along a desired path. More specifically, the field is motion controllers in closed loop systems including mechanical motion control and non-mechanical processes. An object may be a tool head and the path may be a machining path in any number of axes. For example, in a typical 3D printer, each incremental layer is built up by driving a print head in a vector pattern in a 2D plane. Equivalent to driving a tool head over a fixed work piece, the work piece may be driven under a fixed tool head.

Prior art uses a sequence of move instructions, often in a readable text and numeric format, such as G-code, where each move instruction is either executed directly by the hardware of the machine, or is broken into smaller steps by a controller, and those steps are then used to output to drive mechanisms. Motors may be steppers or servos, driven by pulses, micro-steps, pulse-width-modulation (PWM), or analog current or voltage waveforms. Except for the final motor control outputs, all data processing from prior to G-codes may be done in advance, in non-real-time. Prior art computes desired position or velocity waypoints for the controlled system.

Prior art includes the use of Proportional-Integral-Differential (PID) controllers.

The breakdown necessary to convert move instructions into the necessary lower-level motor control outputs may be called a "motion engine," referring both to the method and the machine that executes the method steps. The computational requirements are typically high, requiring both high computational accuracy and high-speed processing.

In addition, the prior art computational sequence (the data processing steps) from move instructions, through a computational "motion engine" is an open-loop sequence. That is, the computational sequence does not take into account any actual, measured real-time position of the tool head (or other driven object), or other parameters of the system and then use that information to dynamically change the output of either the motion engine or the motor control outputs.

Prior art may then use an open loop system from the motion engine to the actual motor. Examples include steps (including micro-steps) to a stepper motor, or voltage or current to servomotor. Modulation such as PWM, or micro-stepping does not change the topology of open loop. Primitive closed loop control at the motor may include detection of missed steps in a stepper motor, or measurement of step time. A closed loop motor control may measure position to maintain a desired position command from the motion engine, or may measure velocity to maintain a desired velocity from the motion engine.

Some prior art does use feedback from the tool head or work piece as input to the motion controller. However, such systems tend to be slow due to the need for stability in the control loop and the relatively long delay between motion commands and the actual tool head position. This is a known weakness of PID controllers with rapidly changing inputs. Also, such feedback systems are complex, requiring very-high precision measurement directly at the tool head. Machine rigidity requirements typically make such machines large and expensive.

Yet another weakness of prior art is the use of only a single scalar (such as position) as the target to achieve in the feedback loop.

Yet another weakness of prior art feedback methods and devices and they have "memory" of the prior operation or state of the system under control. For time-varying inputs, such "memory" may produce large errors or slow settling time. For example, the I (integration) term in PID controller is by its very definition, "memory."

Yet another weakness of prior art is that methods such as PID do not perform well when configured as separate feedback loops on non-orthogonal axes. For example, motion on one axis may affect motion on another axis, appearing as "drift," "offset" or other error. Attempting to compensate for such errors is both slow and then, later, when the other axis is in some other motion, that compensation now produces an error.

Some prior art considers jerk in the form of a binary or three-valued number, such as a "bang-bang" controller.

Yet another weakness of prior art is not taking advantage of known system velocity and acceleration in generating feedback. While some controllers, such as PID controllers, "compute" a value similar to velocity, for example by use of the I (integral) term, this value is computed, rather than a measure of actual, real-time velocity, which may result in errors, noise, stability problems and slow response to system changes.

While we refer to mechanical systems as scenarios, practice and embodiments, claimed breadth includes non-mechanical systems including industrial process and non-industrial processes, including applications in camera control, lighting control, and dynamic biological systems.

SUMMARY OF THE INVENTION

Embodiments of this invention overcome the above weaknesses in the prior art.

In particular, one embodiment of a motion engine iteratively computes a numerical "jerk," which is motion derivative of acceleration, using the calculus definition of derivative. We refer to these embodiments as executing or implementing an "iterative jerk" method or device, respectively. These iterative steps use feedback from the mechanical system, such as a 3D printer, to improve the quality of the output of the motion engine and the motor control outputs.

One embodiment views each "move" as a target, goal point or "waypoint" comprising both a position and a velocity, in as many axes as necessary. Rate and speed are alternative words for velocity. The target or goal is for the tool head to reach both the waypoint position and waypoint velocity. At each iteration of the motion engine, only data relating to the current state of the machine, such as current tool head position, velocity and acceleration, and target position and target velocity are considered by the motion engine method steps. That is, whatever path was actually followed, that is, motion history on the current path to the current waypoint, is not relevant or used by the motion control engine method.

Embodiments use both target position and target velocity as goals, inputs, and benefits.

Embodiments use real-time measured position, measured velocity and measured velocity as inputs; embodiments may use real-time computed velocity or acceleration based on real-time position feedback.

Embodiments use an output of the motion engine solely as a linear, smoothly varying, acceleration scalar, per axis. Some embodiments first compute a jerk, and then apply this to the current acceleration value to generate both an output acceleration value and a new acceleration value for the next iteration. This acceleration value, as a real-time "command" is sent to a motor driver, which may be either open or closed loop to execute and maintain the desired commanded acceleration. Of note, an intermediate position or velocity is not used as a command from the motion control engine to the motor controller. An alternative name for the motor controller is motor driver.

Embodiments are free of a move time to the next waypoint provided as an input to the motion engine. Rather, embodiments compute a move time to the next waypoint. Such computation may be an optimization, a non-iterative calculation, or an estimate. One optimization is to generate a move time that maximizes smoothness, that is, linearity, of velocity values from the current location or waypoint to the next, or target, waypoint. Embodiments are free of a maximum velocity limitation as input to the motion engine. Embodiments translate Cartesian coordinates into polar coordinates, such as used by a dual-axis SCARA arm motion system. Embodiments include other two-axis and multi-axis coordinate systems, including non-linear and non-orthogonal systems.

Note that although "mathematics," "equations" and "algorithm" are used descriptively, no claims are made to any such in isolation of functional, patentable methods and devices. Nor are any claims made to software, as such. Such restrictions of scope are necessary for proper claims construction.

BRIEF DESCRIPTION OF THE DRAWINGS

FIG. 5 shows starting initial values of exemplary execution of a method, in spreadsheet form.

FIG. 6 shows execution of iterations for the exemplary execution of a method in FIG. 5.

FIG. 9 shows equations used in FIGS. 5-8B FIG. 10 shows a portion of a spreadsheet for another exemplary execution of a method.

FIG. 11 shows a block diagram of data flow from a CAD system to execution.

DETAILED DESCRIPTION OF THE INVENTION

All Figures, discussion and scenarios are non-limiting exemplary embodiments.

Figure 1:
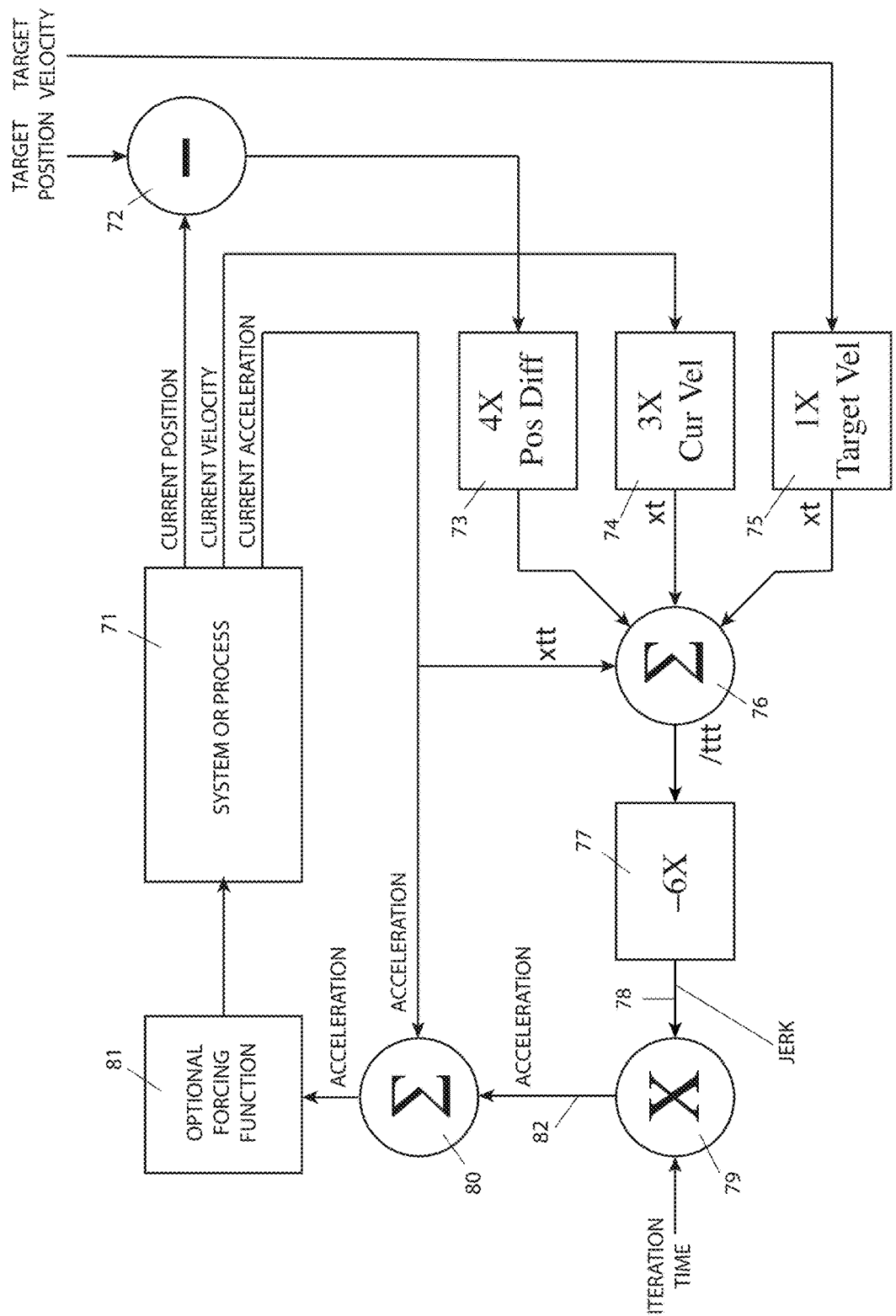
FIG. 1 shows block diagram of an embodiment of both a device and method.

FIG. 1 shows a block diagram of an embodiment of a device and method. It is helpful to consider this Figure together with Claim 1 as originally filed.

The system process 71 is part of some claimed embodiments and not part of others. In either case, it is the system, typically but not necessarily a mechanical system, under closed-loop control by embodiments. As shown, the system provides as an output, or measurement, or sensor values or computations, which may be in the system process 71 proper or may be external to it: a current position, a current velocity, and a current acceleration. Any of these three outputs may be computed from sensor data, rather than measured directly. For example, data from a suitable position sensor, such as a shaft position sensor, may be used to compute current velocity and current acceleration.

Inputs to an embodiment are a target position and a target velocity, shown in the upper right. Often, the combination of target position and target velocity is referred to as a next waypoint, or as a "goal." Note that a core novelty and benefit of the invention is that both the target position and target velocity must reached, as a monolithic waypoint. It is the goal of embodiments to successfully achieve this.

A core novelty of the invention is a method as shown with elements or steps, 73, 74, 75, 76, 77, 78, and 79 that generates a jerk 78 or acceleration 82 as output, and is also free of generating a position, position error, velocity or velocity error signal back to the system or process 71.

The term, "t," used in the Figure is an estimated or computed

Subtractor module 72 generates a position difference value between the target position and the current position. This might viewed—at least in the context of prior art—as an "error" signal with respect to position only.

Module 73 multiplies the position difference value by four, generating a scaled position difference value, in units of distance.

Module 74 multiples the current velocity by three, then multiplies by an iteration time, generating a scaled current velocity value, in units of distance.

Module 75 multiplies the target velocity by an iteration time, generating a scaled target velocity value, in units of distance.

Module 76 sums four values: (i) current acceleration multiplied by an iteration time squared, in units of distance; (ii) the scaled position difference; (iii) the scaled current velocity multiplied by an iteration time; and (iv) the target velocity multiplied by an iteration time. The sum of these four distance-unit values is then divided by an iteration time cubed, generating an uncorrected jerk sum, in units of jerk (derivative of acceleration).

Module 77 multiples the uncorrected jerk sum by negative six, generating a scaled value of jerk, shown as 78. It is this value, at 78, that is one output of an embodiment. This jerk value, 78, may be multiplied by a time interval, such as an iteration time interval, or integrated of a time interval, to produce an acceleration or torque 82. This acceleration value, is optionally added to the current acceleration in summation module or step 80, which is then a desired acceleration, and then fed back as the primary or only feedback signal to the system or process 71. Optional elements 80 and 81 may modify the acceleration, such as linearizing the output of the computation to more closely match actual drive signals to the system or process, such as a motor current or phase angle, in order to actually generated the desired acceleration.

Continuing on with converting this jerk value into an acceleration value to feedback into the system or process 71, the jerk 78 is multiplied by an iteration time in module 79 to convert the jerk to units of acceleration, and then this is optionally added to the current acceleration in module 80 to generate a "feedback acceleration." This may be viewed as "target acceleration" for the next iteration cycle. Ideally, the system or process 71 uses this feedback acceleration to accelerate. In a perfect system, the current acceleration output from the system or process 71 at each iteration would be equal to the input feedback acceleration from the previous iteration.

The term, "xt" means multiplied by t.

Note that embodiments may combine modules shown. Modules and their computations may operate in parallel or sequentially or in any combination. Computations may be digital or analog, or a mix. Computations may be performed by a processor, microcontroller, CPU, MPU, DSP, FPGAs, hardwired logic, or by other means.

Figure 2:
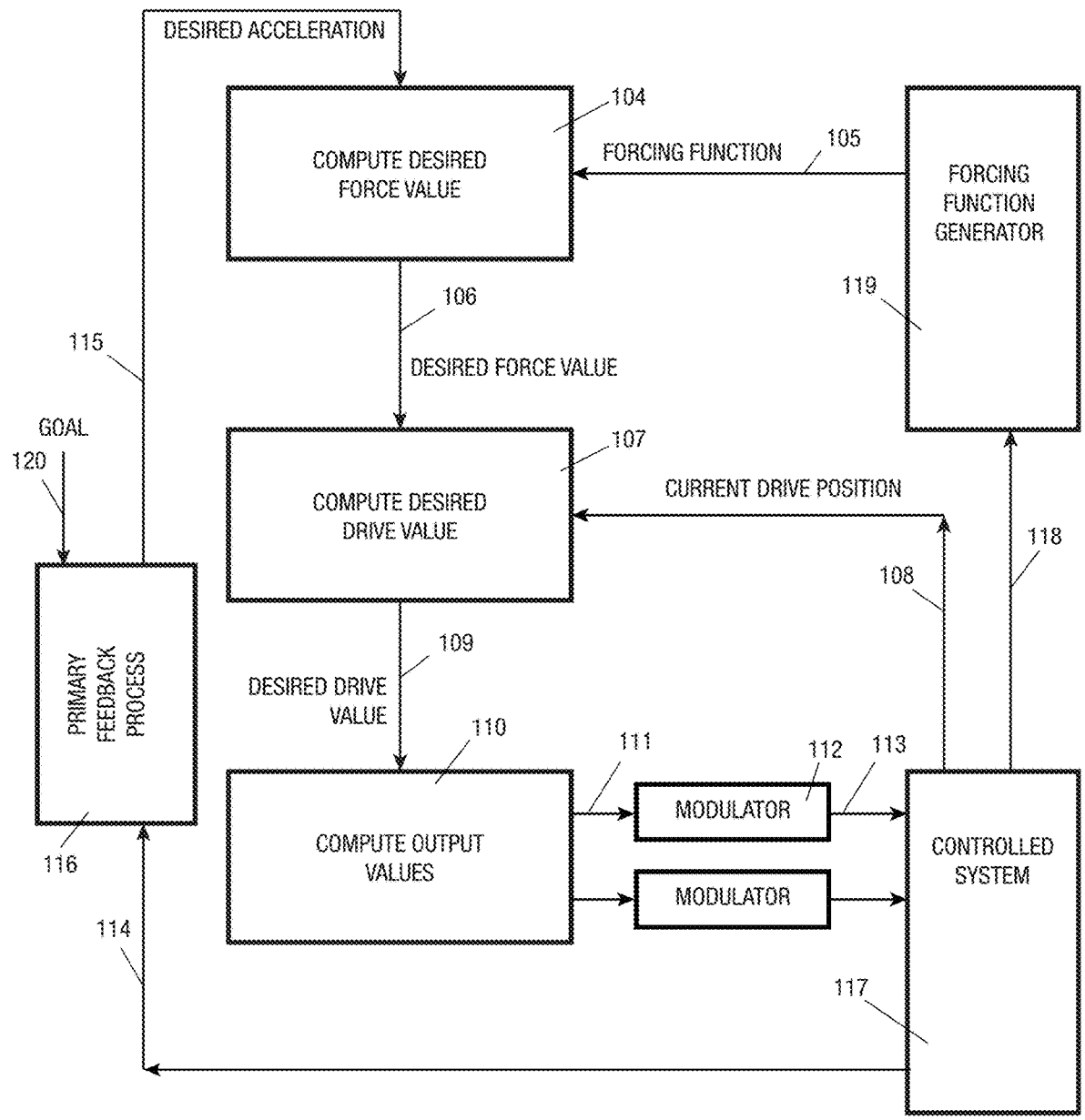
FIG. 2 shows a block diagram of a control system comprising an embodiment.

Turning now to FIG. 2 we see an exemplary embodiment. Implementation may be continuous or discreet. Implementation may use microcontrollers, DSP chips, FPGAs, hardwired electronics, and the like. As those trained in the art know, there are many different technologies and methods to implement elements and steps. Individual elements or steps may be combined into a single physical element, such as an FGPA or other chip. Connectivity between elements and steps may be direct or indirect, and signals may be communicated via a wire, or digital values communicated by a wide range of technologies, speeds and distances.

The system being controlled is shown as 117. This might be a machine tool, motor of many other systems as described elsewhere herein. 116 is a feedback process, typically a computation. It may be a PID controller, for example. It may be an equation in the form $$j=-(6*(4*p-4*pt+a*(tt^2)+3*tt*v+(tt)*vt))/(tt^3),$$

where j is a jerk value, p is position, a is acceleration, v is velocity, pt is target position, vt is target velocity, tt is time remaining to reach a target position. The jerk, j, may be multiplied by an iteration interval time or integrated over a time period to generate an acceleration, which may be an output of element 116. Many other forms of the feedback process of element 116 are known to those trained in the art. The feedback process 116 accepts a goal, such as a waypoint, position, velocity, or both position and velocity, shown as 120. Feedback process 116 outputs a desired acceleration 115. The constants in the equation above, 6, 4, and 3, should ideally be exactly these numbers. However, minor changes, such as ±1%, ±3%, ±5% or ±10% may give acceptable results and each of these ranges is claimed. Thus, any such modifications to the nominal constant values are the correct construction of these values. For comparable results, the Rule of Equivalents applies to infringement determination.

A forcing function execution 104 converts the desired acceleration 115 into a desired force value 106, using a non-linear forcing function 105, shown as provided to the computational element 104. The forcing function 105 may be static of updated dynamically. The purpose of the forcing function 105 as computed by element or step 104 is to linearize the feedback loop.

Element or step 107 computes a desired drive value 109 from the desired force value 106, and optionally from a current drive position 108. For example, a desired force value 106 may be measured as a torque, such as in units of newton-meters. The desired drive value may be a field strength, coil current, motor voltage, PWM percentage, or other parameter that more closely matches an actual signal that drives a motor or other actuator in the controlled system 117. The computation in element or step 107 may as simple as a linear multiplication or addition to effectively perform unit conversion. A more complex calculation in element or step 107 may be to consider a current drive position 108, such as a shaft angle or phase. A desired force value 109 may be a difference, such as a phase offset from the current drive position 108. As an example, a desired force value 106 may be nominally a motor torque to achieve a desired acceleration 115. The desired acceleration value 115 from 116 may be relatively constant over a number of iterations of the primary control loop. However, during these iterations a multi-phase motor in system 117 cycles through multiple phases. Thus, the current drive position 108 cycles repeatedly and the desired drive value, in this example a differential phase angle, also cycles through multiple phases.

In element or step 110 an output value is generated or computed from a desired drive value. In some embodiments, this step is optional. This element step 110 may need to convert a drive value such as a torque or phase offset angle into two phase angles, one or more voltages, or PWM percentages. Element or step 110 may be needed to convert a scalar input 109 to two outputs, such as necessary to drive a two-phase motor, such as a two-coil stepper motor. Some embodiments require three output phases. Such conversion is application or embodiment dependent. Element or step 110 is optional. The output(s) of 110 are shown as 111.

Elements or steps 112 are optional. For example, their inputs 111 may be a PWM percentage. The modulators 112 may then generate a PWM pulse train with the duty cycle specified in their inputs 111. The modulators 112 maybe amplifiers or other electronic drivers, such as current drivers for motor coils. The outputs of the modulators or amplifiers 112 are shown as 113 and are typically directly connected to an actuator, such as a motor, in the controlled system 117, although there may be additional intervening elements, such as amplifiers, limiters and the like. FIG. 2 shows two channels, as elements 111, 112 and 113 are shown in duplicate. Such an embodiment is suitable for a two-coil stepper motor, for example. Various embodiments might have one, two, three, or more channels.

The controlled system 117 provides an output signal 114 which might be a position, velocity or other parameter, such as temperature. This signal 114 may be a scalar, vector, or set. For example, it might include both position and velocity. It is typically provided by a sensor in the controlled system 117, such as a shaft encoder. Wide ranges of sensors are known in the art and are system and embodiment dependent. Signal 114 is provide as the "feedback" from system 117 to the feedback process or computation 116.

This primary closed loop is the path 116, 115, 104, 106, 107, 109, 110, 111, 112, 113, 117, 114, noting again that some elements or steps are optional or "pass-through." Note that the goal 120 for the closed-loop system is not in the primary feedback loop proper, but rather informs this embodiment or system as to its target. Also, the forcing function is used in element or step 104, but providing a forcing function 105 is outside of the primary feedback loop proper.

It is convenient, but not a limitation, to think of the controlled system 117 as a mechanical system such as a motor or machine tool, and element or step 116 as a purely computational step.

Figure 4:
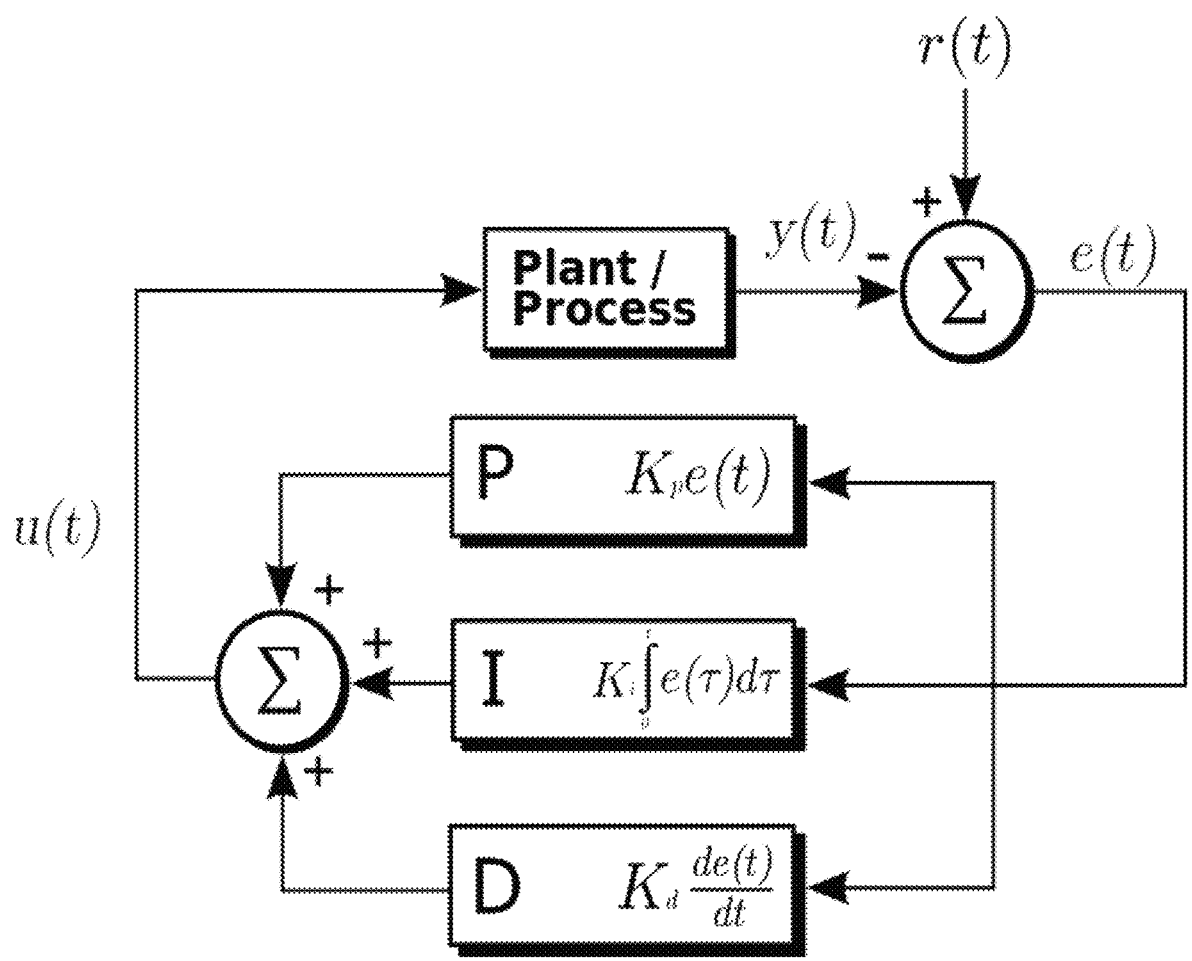
FIG. 4 shows prior art.

In comparing FIG. 2 to prior art in FIG. 4, the "Plant/process" in FIG. 4 is generally system 117 in FIG. 2. The computations of P, I, and D, and the two summations would be inside the primary feedback process element or step 116.

The r(t) in FIG. 4 corresponds to the goal 120 in FIG. 2. Note that the PID loop in the prior art FIG. 4 includes no forcing function element or step 104 and no non-linear computation. Prior art does not include inputs of both velocity and position as goals into a computation.

In some embodiments, signal 108, a current drive position, may not be required. For example, in a simple single channel DC servo application, a force value 106 may be torque or voltage. This value may pass directly to a single modulator 112 that is an amplifier that directly drives the servo motor in system 117. Even in such a simple system, a non-linear forcing function in element or step 104 may be valuable. The servo motor torque may not be linear with voltage, and this element or step may correct for that. In some embodiments, element or step 104 may have additional inputs not shown in FIG. 1, such as a motor speed, motor load, system temperature or any of many other factors.

The primary closed-loop control system shown in FIG. 2 is typically for a single axis or single scalar (such as temperature). However, in practice, it is often necessary to control multiple axes. One such method is to essentially duplicate copies of the FIG. 2 control system for each axis independently. However, most often the axes are not fully independent, such as a single waypoint comprising target positions in multiple axes. Thus, some elements in FIG. 2 may be shared between each implementation for each axis.

Embodiments include and apply to non-mechanical systems that have corresponding or analogous elements, such as controlling temperature.

FIG. 2 also shows an additional feedback loop, we call an "outside loop." This feedback loop observes the controlled system 117, with that observation 118 causing element or step 119 to select or compute a forcing function 105, which is then used by element or step 104 in the primary control loop. This outside loop typically operates at a much slower iteration rate than the primary control loop. It may be as slow as one iteration each time a component, such as a motor or load, is replaced in the controlled system 117. It may operation only upon execution of a calibration or other operation of the controlled system 117 for the express purpose of allowing element or step 119 to select or compute a forcing function 105. It may operate continuously, observing controlled system 117 during operation and updating the forcing function 105 periodically.

FIG. 2 also shows and "inside loop" comprising elements or steps 108, 107, 109, 110, 111, 112, 113, and 117. This inside loop operates close to the motor or other actuator in the controlled system 117. For example, its job may be to provide a desired field flux, or coil current in a motor. One may think of the job of this inside control loop to implement and maintain the desired force value 106. The inside control loop typically operates at a faster iteration rate than the primary control loop. However, its iteration rate may be as slow as the rate of the primary control loop. For example, the primary control loop may run at a rate of 100 to 1000 times per second, while the inside control loop runs at a rate of 1000 to one million times per second. These rates may vary dramatically, depending on application. For example high-speed modulators for satellite communication may run at a gigahertz rate, while a system that tracks or manages infectious diseases or global warming may cycle on the order of weeks. The inside control loop may be implemented with analog electronics while the primary control loop is digital.

Figure 3:
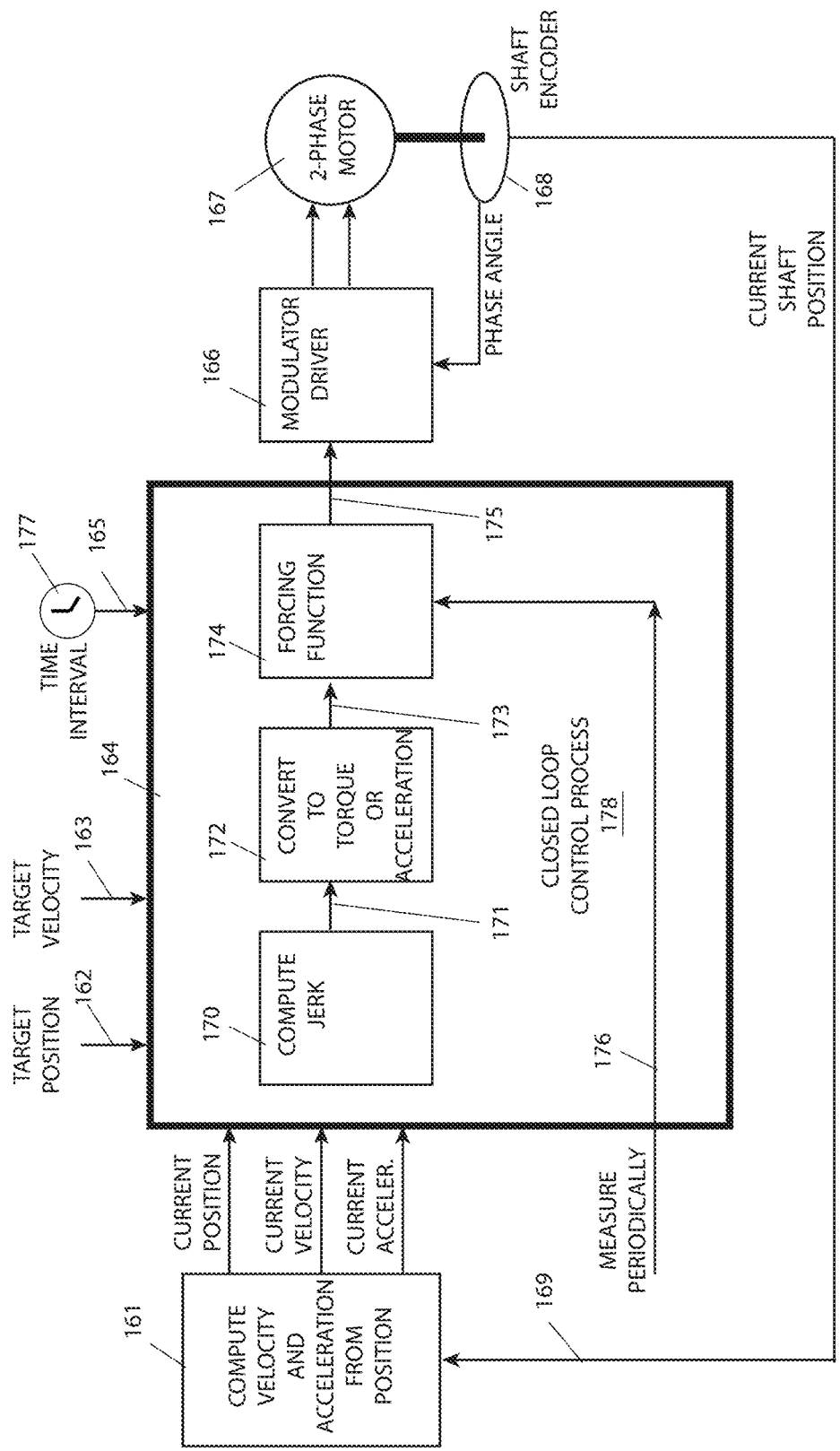
FIG. 3 shows a block diagram of an alternative control system comprising an embodiment.

Turning now to FIG. 3 we see a number of different embodiments. A primary embodiment is the closed loop control method and device of the bold box 178, including use of shown inputs and structural elements therein. Such embodiments accept target position 162 and target velocity 163. The operation of the embodiments is specifically to reach both the target position 162 and the target velocity 163 at the end of a current move by implementing closed-loop and real-time iterations. Real-time inputs include a current position and current velocity. These may be both measured from the physical system, e.g., motor 167, or only position is measured 169 and the velocity may be computed from position in box 161. Such computation may be faster or more frequent, or higher bandwidth, than for the overall loop, such as iteration rate shown within box 178. Also, the feedback in box 166 may be faster or more frequent, or higher bandwidth, than the overall loop. Indeed, a core benefit of embodiments and this architecture is higher system performance specifically because loop comprising 166-167-168, or computation in 161, or both, are faster than the loop rate. Such differences in rates are claimed as embodiments.

Box 161 by itself is prior art but this element is included in some embodiments.

A key and novel step in the closed-loop iterative process is the computation of jerk in element or step 170. Some embodiments include a defined computation in this step while other embodiments do not include the nature of the computation explicitly. Element or step compute jerk 170 may be outside the scope of a claim, and thus lack of specification of such computation does not make the claim invalid due to lack of disclosure specificity. Typically, the input step 170 includes the current position, velocity and acceleration, and the target position and velocity. The output of element or step 170 is jerk scalar 171. In step 172 the jerk is converted to a torque or acceleration value. Such conversion may be a linear constant, which may have a value of one. That is, conversion is simply a pass-through function with a change of units. The output of this step 172 is an acceleration or torque scalar 173. For embodiments where step 170 is outside the claim, element or step 172 accepts a jerk value as input. A forcing function 174, which is optional or missing in some embodiments, corrects for non-linearities in the system, such as non-linear motor torque as a function of phase angle offset, or dead-bands, and the like. Forcing function 174 may also correct for eccentricity or non-linearity of a shaft encoder 168, or any other sensor. The forcing function 174 may also compute, test for, or enforce limits. The output 175 of the forcing function 174 is a scalar, unitless Q that may be used by a comparatively simple modulator/driver 166 to drive a motor 167 or other target. However, value 175 is neither a position nor a velocity. It co-varies with torque. The modulator/driver 166 is not a step or device to achieve a position or velocity. For example, it does not simply generate steps to a stepping motor based on step commands—which are generally position commands, but may be considered velocity commands by consideration of the rate at which they are generated. One example of value 175 is a motor phase offset. Such an offset is the difference between the physical motor shaft position and the magnetic field strength of the motor coils. Such an offset provides torque to the motor shaft. The relationship of phase angle to torque may not be linear, which is the purpose in some embodiments of step 174. The purpose modulator/driver 166 may be viewed as simply a conversion from a desired torque value 173, as linearized, limited, or otherwise modified by the forcing function 174, to the motor. That is, the modular/driver 166 drives the motor 167 to achieve a desired motor torque. In one example, as described in the specification above, the modular is a pulse-width-modulator (PWM) that operates with in put in the range of 0% to 100% and converts this scalar input to the two phases needed to drive a two-coil stepping motor. On some embodiments the motor has a single coil, such as a classic DC servo-motor or may have more than two-coils. In order the modulator driver to maintain a commanded phase offset via input 175 it needs to know the current shaft or rotor phase, which may be provide via a shaft encoder or other position encoder 168, as shown in the Figure. In some embodiments the modular/driver 166 is not part of a claimed scope. In some embodiments, the motor 167 and encoder 268 are not part of claimed scope. However, other embodiments include a complete closed loop system, as shown in this Figure.

One embodiment of element or step or steps of module 166 are:

(i) The current position of the rotor is converted a "phase", which may be the number of steps divided by four, modulus 2-pi for units conversion.

(ii) The neutral field phase is determined by using the "detent force equilibrium table" and then adding the "clamped forcing value" to that. The detent force equilibrium table is the phase of rotor(x) to field value(y). This table may be built during device calibration and may be updated from time to time. It may be supplied externally. A clamped forcing value is fixed, normalized or limited to the range of plus or minus 90 degrees.

(iii) The neutral field phase from above is the looked up in a "shaped waveform" for pulse-width-modulation (PWM) duty cycles, which represent the sine and cosine of two motor phases. The outputs of the PWM modulators are effectively current, voltage, power or field strength in the motor windings. The outputs of the PWM modulators determine the motor torque and direction of that torque.

Continuing with FIG. 3, in some cases the forcing function 174 changes from time to time. The effective forcing function may be measured periodically from the physical system and then updated to element or step 174, as shown by 176. Such measurement may be viewed itself as a closed loop system. However, such a loop typically operates very much slower or less frequently than the iterative move controller 178. Various forcing functions and measurement techniques are described above in the specification and also in various Figures, and also some embodiments in claims. Shaft encoder 168 may an optical or magnetic encoder. It may be a single or multiple hall-effect sensor(s) IC with a magnet mounted on—or connected to—the shaft of motor 167. Some hall-effect sensors may have significant non-linearity and eccentricity. Such correction may be done within the encoder 168, in step 161, or by the forcing function 174. Some embodiments of the forcing function 174 are also responsive to current position or current velocity, or both. For example, eccentricity of the encoder 168 may require knowing the current position. As another example, motor back EMF or friction may be taken into account by considering current velocity. In one embodiment of signal 176 the unitless value Q as well as the current acceleration from step 161 are used to periodically update the forcing function, 174. A suitable hall effect sensor is AMW AS5311. (ams AG, Tobelbader Strasse 30, 8141 Premstaetten, Austria)

In FIG. 3 a timer is shown as 177. It provides a time reference 165 to the closed-loop process 178. Typically, the time interval 165 corresponds to each iteration of the loop. For analog systems, subsystems, or components, differentiation steps have an effective timer interval by the nature of their constants or units; e.g., meters per second, or radians per second squared, and the like.

Although a crucial aspect of embodiments of the closed-loop process 178 is that no "memory" is kept of prior position, velocity, acceleration, or jerk, elements such as 161 are likely to need memory in order to compute an actual system position from a simple shaft position input 169. The full range of some systems may be many cycles of the motor shaft. In addition, any computation of velocity in step 161 requires at least prior position to be known.

FIG. 4 shows prior art: a proportional-integral-differential, "PID" closed loop control. Such prior art is well known and will not be described in detail here. Note that such a loop controls only a single target parameter, typically position. It is not capable of controlling to reach both a target position and target velocity. Another weakness of a PID controller is its inherent uses of "state," or history information, in the form of both the integration I term and the differentiation D term. For varying inputs, such state history is effectively irrelevant for the new input goals and as such interferes with the current goal.

Turning now to FIGS. 5-9 we see various portions of the same single spreadsheet, showing execution of approximately 13 iterations of an exemplary target position and velocity pair from a starting position and velocity pair. Multiple drawings are necessary due to the obsolete formal limitations of current patent drawings. Reference to elements in these Figures includes row and column designators, shown here as typically shown in the art of spreadsheets. Note that these Figures are screenshots of a single "live" spreadsheet, meaning that rows, columns and use of row and column cell identifiers in the Figures, such as in equations, are internally consistent. One may easily replicate a similar live spreadsheet from the information in these Figures and text.

FIG. 5 shows input parameters to an exemplary starting and ending waypoint for an exemplary embodiment. The starting state position, velocity and acceleration, p, v, and a are shown in E2:H5, including units. Cells G3:G5 hold numbers for the values of these parameters. Here, these are all zero. The target waypoint, or goal state is shown in A2:D4, including units. Waypoints include both a position and a velocity; it is often convenient to refer to this pair as a state vector. Note, however, than for most systems a complete system state includes additional parameters. Here the target position pt is 10 and the target velocity vt is zero. Cells C3:C4 hold number for the value of these parameters. Rows 7 and 8 are text comments. The equation used, shown only as text, not an operative equation is shown in row 8. The equation uses three constants: 6, 4, and 3. In the spreadsheet these are assigned to the variable names m1_, m2_ and m3_, and are shown in cells I2:K5. These constants are discussed in additional detail elsewhere herein. An iteration interval is shown in cells L2:O3. The value, 0.23 seconds, is in cell N3. A typical system embodiment will often have an iteration interval fixes, such as 10 milliseconds (ms). However, such a time is application specific and may vary widely, from nanoseconds to months, or even broader.

For convenience the above discussed parameters are reproduced in block A11:D18. The one new value in this block is the estimated-time-of-arrival, or ETA, variable tt. A discussed elsewhere herein, this value is often determined in advance, meaning ahead of real-time operation, by a selector or optimization step. Here the ETA is 3 seconds (s), in cell C17.

Computed jerk and then from the jerk j, computed next acceleration, next a, are shown in cells A19:D21. Cells C20 and C21 hold equations, discussed below. The output of those equations, computed by the spreadsheet, are shown, as 8.89 and 1.02 respectively. These two values may be considered to be the output of an exemplary method for the first iteration. However, for convenience, we identify to this as iteration zero herein. These two values are the output of this method execution path and are used as inputs for the next iteration.

FIG. 6 shows an embodiment of a method actually running. Column A contains names of the values. Column C contains the starting values and the first computed j and next a, as discussed above. Cells D26:P35 hold equations and the Figures shows the computed results, by the spreadsheet. Equations used as shown and discussed below. Each column, such as C through P, shows an iteration of the method of an embodiment. The iteration numbers, for convenience, are shown in row 25. Note that equations of embodiments do not use the iteration number directly. Note that the target position pt, the target velocity vt, the iteration time interval ts, in rows 29, 30 and 32 respectively, do not change. The time remaining, or ETA, tt, row 31, drops linearly, each iteration, by the iteration time interval ts. The values for position, velocity, acceleration and jerk in this Figure are plotted as graphs, generated by the spreadsheet, in FIGS. 7A-8B. As can be seen, the target waypoint of position pt=10 and velocity vt=0 are effectively reached close to iteration 13, in column P, where p=9.99 and v=0.18.

FIG. 9 shows key equations. Note that this Figure is a screenshot from the same spreadsheet used for FIGS. 5-8B. Cells C12:C18 and C26:C32 show that values in these cells are simply replicated from the data setting region of the spreadsheet, discussed above. The equation in cell C20 does not display completely in this Figure and should be ignored for the moment. The key equation for the embodiment is shown in cell D34. This equation uses only "current state" information about the system being controlled. This may be readily seen in that all non-constant inputs are from the same column: here column D, representing the same iteration or current point in time. That is: the current, instantaneous, system state. Acceleration for the next iteration, in cell D35, is computed from the jerk, j, in cell D34. It is the integral of jerk for one iteration time (here, 0.23 seconds). The equation for the integral is "current-acceleration+(current jerk−previous jerk)*iteration-time-interval/2." For the initial calculation of next acceleration, a previous jerk value may be, but is not necessarily, zero.

Equations for position and velocity are similarly integrals, shown in D26:D27 respectively. For this spreadsheet, it is necessary to "simulate" position, since no actual system is being run by the spreadsheet computations. As discussed elsewhere herein, typically position and often velocity are real-time inputs, not computed. Velocity is the integral of acceleration and position is the integral of velocity.

The live equations in cells D26:D35 are replicated (typically with a cut and paste operation) into cells D26: P35. The results are shown numerically in FIG. 6 and plotted in FIGS. 7A-8B. Since the target waypoint is reached at about iteration 13, column P, there is no computation of jerk and next acceleration, cells P34:P35, since there will be no further iterations.

Figure 7A:
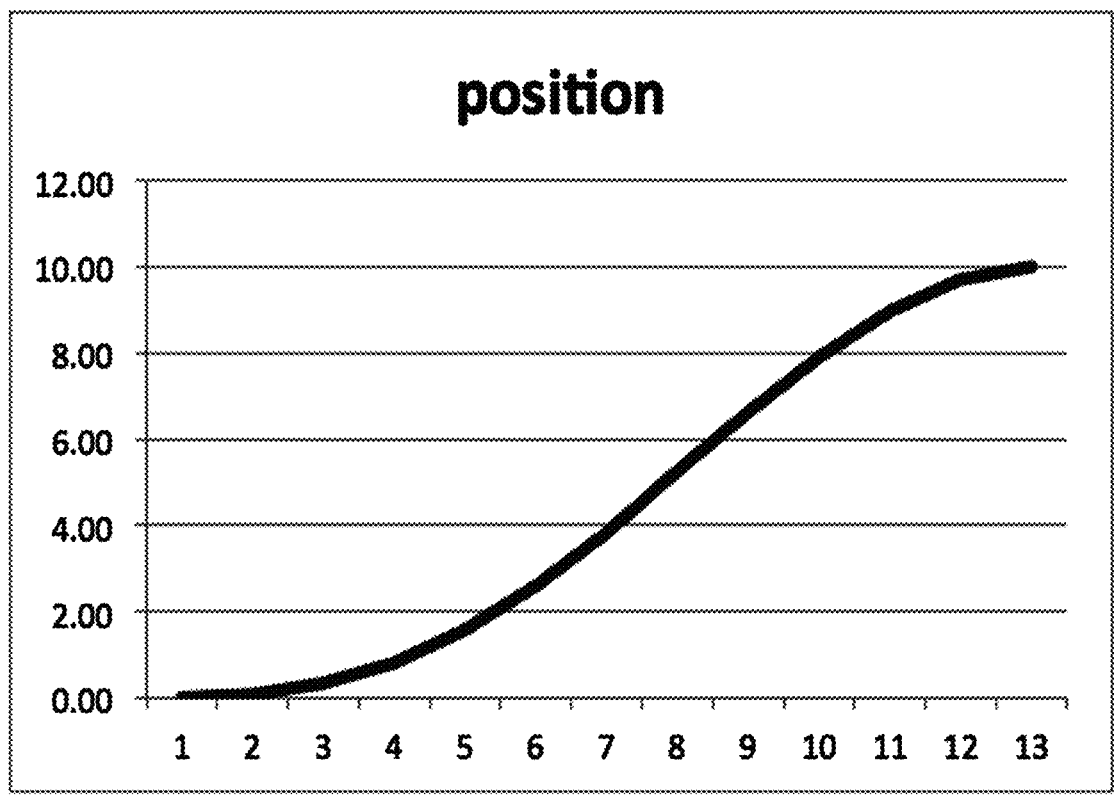
FIG. 7A shows a graph of position from the exemplary execution of a method in FIG. 6.

FIG. 7A shows a plot of position, from the above data. It is clear to see that the position changes from zero at the start to 10 at the end, as desired and set by pt.

Figure 7B:
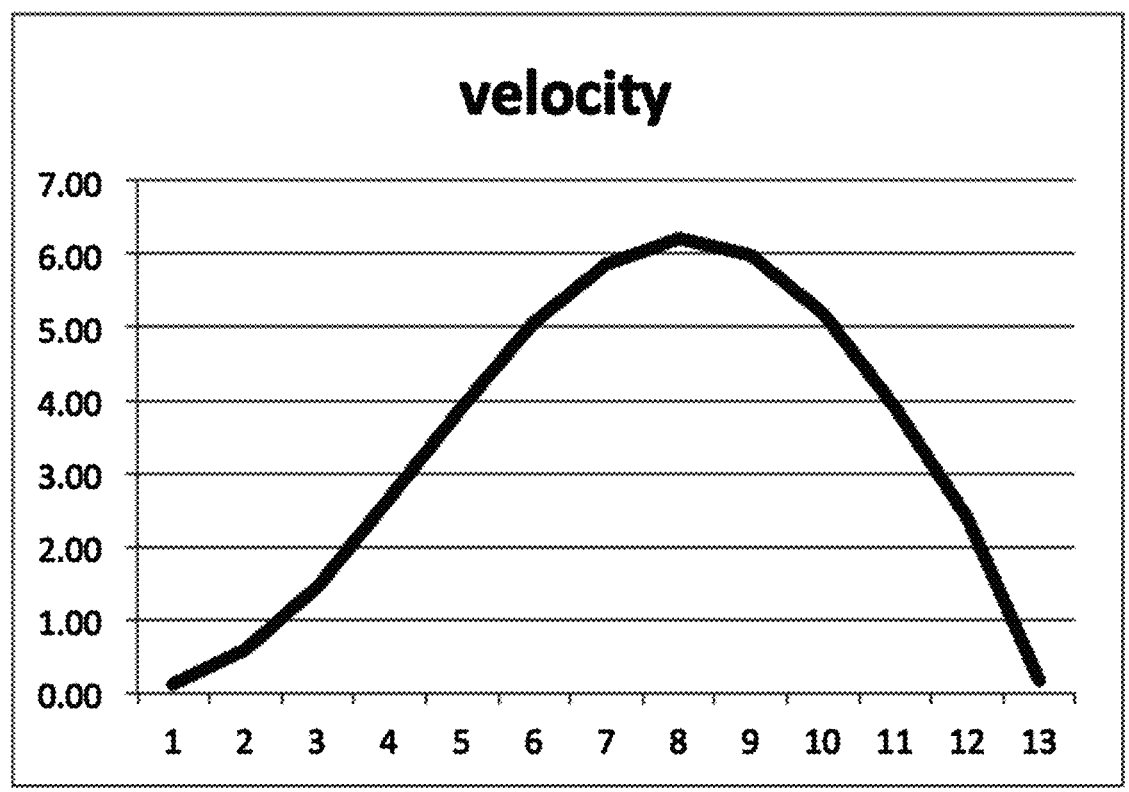
FIG. 7B shows a graph of velocity from the exemplary execution of a method in FIG. 6.

FIG. 7B shows a plot of velocity, from the above data. It is clear to see that both the starting and ending velocity are zero, as desired and set by vt.

Figure 8A:
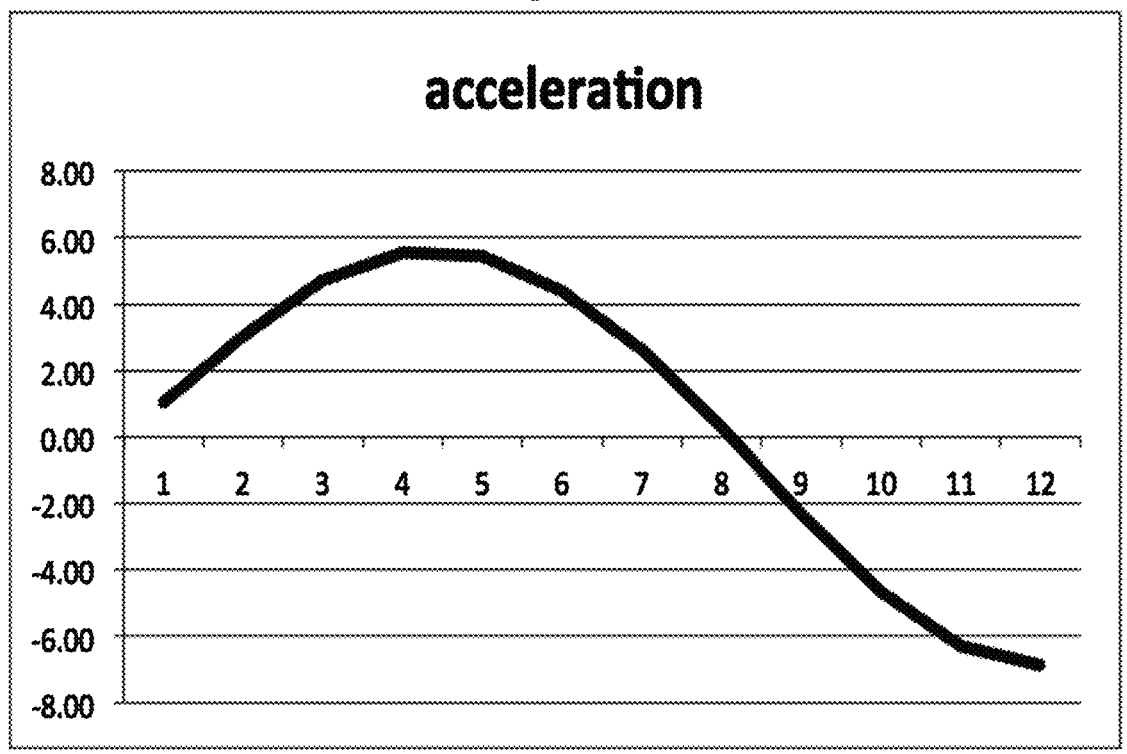
FIG. 8A shows a graph of acceleration from the exemplary execution of a method in FIG. 6.
Figure 8B:
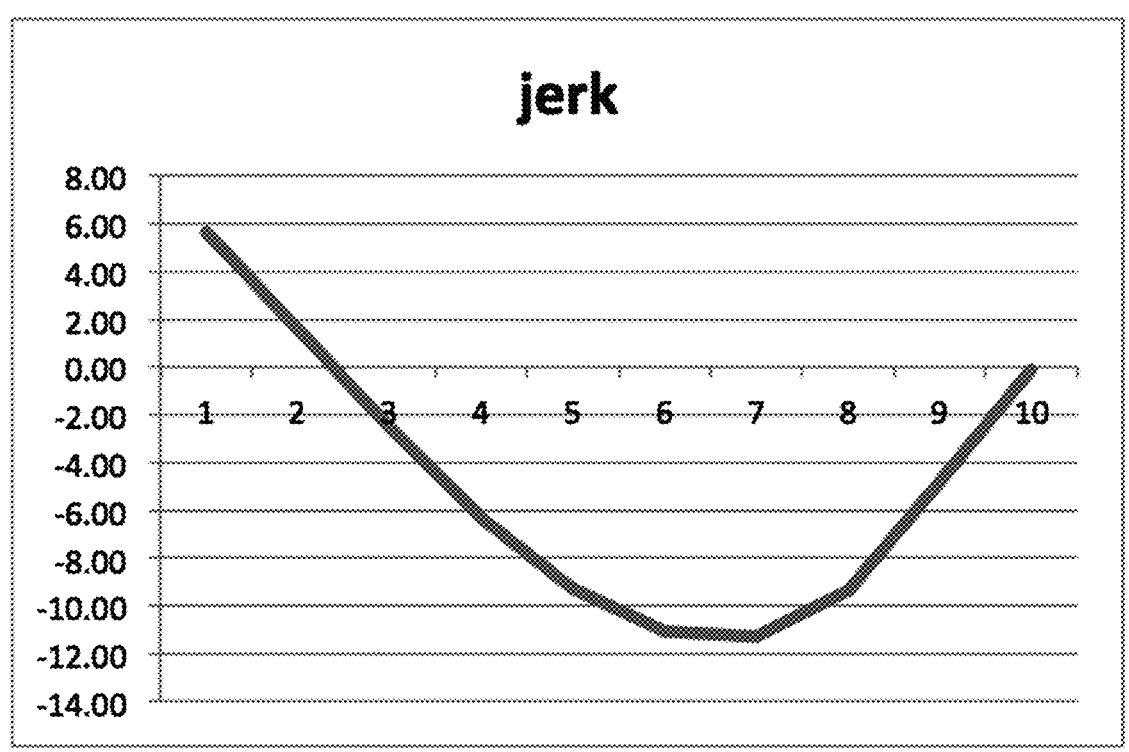
FIG. 8B shows a graph of jerk from the exemplary execution of a method in FIG. 6.

FIG. 8A shows a plot of acceleration, from the above data.
FIG. 8B shows a plot of jerk, from the above data.

Note that values for jerk and acceleration must be continuous for embodiments. This is distinct from prior art, where typically acceleration or jerk have limited values, such as −1, 0 or +1.

An advantage of embodiments over prior art is the immunity of the methods to real-world problems such as noise, minor sensor errors, non-linearities, friction, and the like. One may test such immunity by modifying the spreadsheet equations to introduce errors, such as random numbers or fixed "droop" or friction errors. Such experimental errors may be introduced in the computations for p and v, or in other places. One may observe that even in the case of very substantial noise or droop that that target position and velocity are usually reached with reasonable accuracy. Such demonstrations are left to the reader. Prior art methods do not have such immunity.

The graphs in FIGS. 7A, 7B, 8A and generated directly within the live spreadsheet by the spreadsheet using the values shown, at least in part in FIGS. 5 and 6. FIGS. 7A, 7B, 8A are screenshots.

FIG. 10 shows the same spreadsheet as above with a different target velocity, vt. Here, the target velocity is 10, shown in cell C16. As can be see in column P, the embodiment and spreadsheet reached this goal at about iteration 13, with values 9.90 for both position and velocity. Observing plots is left as an exercise for the reader. Note that the velocity v in row 27 is nearly linear, with a "soft start" acceleration in row 28.

Turning now to FIG. 11, we see an embodiment that includes steps from the output of a Computer Aided Design ("CAD") or Computer Aided Machining ("CAM") system, through to real-time execution of such as design on a machine. A CAD system or other source typically outputs data in a standard format, such as G-code, 401 or STP file format, not shown, or a proprietary format, 403. Whatever the input data format from a part design, a parser, 402, parses the data stream or file to create a set of move instructions, 404. These go into a module called a motion control API, 405, that adapts the motion instructions 404 into moves within a known set of possible moves, or API, such as seek, trace, curve, move, or dwell. The output of module 405 is a set of moves, or API calls or objects within a motion control framework or previously defined set of options, features and capabilities. The well-defined moves are shown 406. These moves go into to a queue, 407. The queue may also perform functions on the moves, but in our shown embodiment it is just a FIFO queue. One reason for the queue is to time-domain match upstream modules 401, 402, 403, and 405, which may be remote, or non-real-time, with real time modules such as 409 through 414, which may be inside of a machine tool or otherwise execute in real-time. The queue may operate as "push" or "pull," depending on implementation. In one embodiment the input to the queue may be viewed as non-real-time while the output is viewed as real-time. The motion commands 408 from the 407 are input to a planner 409. A planner may be complex, performing multiple important steps, such as coordinate transformation, breaking move commands into series of waypoints, optimization, boundary and end-point detection, range checking, scaling, and other steps. Coordinate transformation may be from a Cartesian coordinate system in a machine coordinate system, such as a polar coordinates system, SCARA configuration, or many other machine coordinate systems. For example, driving the motion of a shovel in a backhoe with hydraulic valves is a complex transformation from a 3D Cartesian map of desired dirt shape. Similarly, controlling a follow spot on a stage dancer is a complex transformation from known choreography to control of the light. Often, boundaries between moves require special handling, such as motion at a corner. The output of the planner is shown as provisional waypoints, 410. An optional step is an acceleration optimizer, 411. Operations within this module 411 may alternatively be performed in the planner, 409. Typically this module 411 is both machine specific and application specific, such as known details of a part, such as material, or linearity correction functions unique to one machine, or unique to one machine at the current time. The optimization may be responsive to user input, such as selecting a fast, "draft" part fabrication versus a slow, "final" part fabrication. This step may also perform machine characterization or calibration. The output of module 411 is final waypoints, 412. These waypoints, typically position and velocity pairs, plus an estimated ETA or tt, are then sent to the real-time actuator control, module 413. This module 413, in one embodiment, comprises the equations and iterative control described generally in FIGS. 1, and 5-8B, and associated claims, including claim 1 as filed. Sensor feedback, such as position, is shown in arrows 416. A forward arrow to the machine 416 is an output step of embodiment methods. The machine, 414, may also be a system or process under control. It may be a machine tool, or a motor, or any of many other "machines," motors, or actuators, as discussed extensively elsewhere herein. Arrow 415 is part of an optional "outer feedback" loop, that may include machine characterization or calibration, such as linearization tables or functions, such as a "forcing function,"

An action (both a step and a benefit) of embodiments is that the tool path improves in effective accuracy, at either the feedback points or the workpiece, during the course of each individual mechanical move in the mechanical system. A benefit is that faster machine performance is possible, both at the level of the machine controller and the overall system. Yet another benefit is higher stability in the control loop.

Here, we distinguish four nested levels of tool head control, (or equivalently, workpiece movement.) The largest level is a "path," which is a macroscopic target or goal related to the piece or project. A path has a starting position and an ending position, and requirements on how the path is followed. A path may be simple or complex; it may be a straight line or curved; it may be on one axis or multiple axes. An example of a path is movement of a cutting head along a full edge of a workpiece. A path may part of the series 404 or 406 in FIG. 11. Another example of a path is the path a backhoe shovel takes from a pile of dirt, into a trench, scooping up more dirt and depositing it back on the pile. Additional examples of paths include a sports play or a performing arts piece.

The second level of detail is a "move." Paths are broken into moves by a parser of some kind. The parser is specific to the system. For example, a G-code parser takes 2D or 3D CAD data as input and generates a series of moves where each move is a line in G-code. Another parser example takes the backhoe path in the above example and breaks it into sequences of mechanical moves that may be accomplished by a one or more hydraulic pressure points, lines or curves. Note that the parameters for a specified move may well be multi-axis. Moves are shown in the series 406 in FIG. 11.

A third level of detail is a series of "waypoints." A second parser, or a geometry-specific "planner," may convert each move into a series of waypoints that are both more manageable and are consistent with the geometry and mechanisms of the system. One example of a planner is a process that converts Cartesian coordinates of G-code to a radial coordinates system for a machine tool that uses one or more radial mechanisms. Another example of a planner is a process that converts a three-dimensional move of a piece of construction equipment, such as a backhoe, into linear motions, scalars, for individual hydraulic cylinders. Yet another example of a planner is a process that converts the arc of a sports ball to the motion axes of a pan-tilt-zoom camera. Yet another example of a planner is a process that converts the movement of one or more dancers on a stage to the mechanical actuator motions of one or more stage lights or cameras. Yet another example of a planner is a process that converts the mutation or communicable processes of an organism or disease to specific actions that may be performed to monitor or control the mutation or spread of a communicable disease. Waypoints are shown as part of series 410 and 412 in FIG. 11.

It is important that embodiment waypoints include both a position and velocity. Prior art waypoints are generally position only. When we discuss a "move" herein, from one waypoint to the next, such a move includes both position and velocity.

Generally, we consider waypoints to be on a single axis. The planner generally converts multi-axis inputs into parallel single-axis outputs. However, in some embodiments, such conversion to multiple, single-axis data or methods may be later in the process, such as in the acceleration optimizer or in the real-time actuator controller.

A fourth level of detail is an iterative method of an embodiment of this invention. This iterative method provides real-time control outputs to achieve a move from one waypoint to the next waypoint. Such move is implemented as an output acceleration from the iterative jerk method to a motor controller that takes that acceleration scalar as its input and maintains this desired motor acceleration (or torque) either open-loop or closed-loop. Such real-time iterative closed-loop control is shown in module or step 413 in FIG. 11.

Note that any of the first three levels of motion breakdown: path, moves and waypoints are optional in embodiments. One or more levels may not be required in all systems or in all embodiments.

To summarize (with some exceptions): a sequence of real-time iterations moves a tool head from one waypoint (current position and velocity) to the next (target position and velocity); a sequence of waypoints implements a move; and a sequence of moves implements a path. A series of paths typically machines or builds a part, or accomplishes a non-machining goal as discussed elsewhere herein.

A key requirement of embodiments is that waypoints have both a position and a velocity. In mechanical systems, the terms position and velocity (or speed, in some cases) have their normal mechanical meanings. In some systems, an equivalent parameter must be identified. For example, for organism mutations or the spread of a communicable disease, "position" may be an identified state while "velocity" is the rate of change of that state. Note, of importance, is the change in meanings of "position," "velocity," and "acceleration" from initial multi-axis values (typically) to single-axis values required for the iterative jerk motion control method. For each axis of control, the iterative jerk motion control method is executed in parallel.

Both mechanical and non-mechanical systems have a mass, a spring constant and a damping factor, or their equivalents. For some systems these three parameters are known in advance, can be estimated, can be measured in real-time, or can be ignored. However, for many systems, not all of these three parameters easily known. Even if one of these parameters might be measured or computed in real-time, the knowledge of that parameter might be difficult to incorporate into the control system. It is for these systems that embodiments of this invention are most valuable.

The goal and benefit of the iterative, closed-loop method of embodiments is to reach both the position and velocity or the target waypoint as closely as possible. To do this, the method uses as its primary input the current position, velocity and acceleration of the tool-head. Note that any of these three inputs may be either measure directly from the motion system or may be computed from the other measurements. The computation within each iteration also uses the position and velocity of the target waypoint—however these two parameters are fixed prior to the start of any iterations and are not recomputed during iterations. The motion prior to the current iteration is not part of the computation for the iteration. This overcomes a major weakness of prior art, such as the "I" term of a PID controller. Of course, that prior motion produced the current position and velocity. In addition, the actual motions of the system may be used to compute parameters in real-time, where these parameters maybe used for optimization or selection of "constants." However, we consider such optimization and selection, although part of some embodiments, to be secondary inputs to the method.

Of note, we discuss, "tool head." However, in all cases unless otherwise noted, the discussion, examples, embodiments, drawings and claims apply equally to moving a workpiece. Of note, we use the term, "velocity." In applicable systems, velocity may be construed as speed. Of note, we discuss primarily motions in a single axis. However, in all cases unless otherwise noted, the discussion, examples, embodiments, drawings and claims apply equally to multiple axes. Axes may or may not be orthogonal, and may or may not be independent. Of note, embodiments are particularly applicable to systems where multiple axes or control elements are interdependent or non-orthogonal. Such systems often have difficult or effectively impossible optimized open-loop control systems.

Embodiments of this invention compute, for each iteration, a "jerk." See FIGS. 1 and 3, and claim 1 as originally filed. A jerk has the units of distance-per-time-cubed, which are the units of the slope of acceleration. One may broadly view a "jerk" as causing a change in acceleration, just as acceleration causes a change in velocity and velocity causes a change in position. Control systems using this "jerk" are novel, as described and claimed.

Although we often use herein measurement units of distance, distance-per-time, distance-per-time-squared, and distance-per-time-cubed, in some embodiments these units are actually, radians (or another unit of angular measurement), radians-per-time, radians-per-time-squared, and radians-per-time-cubed. Units of time may be seconds. Those trained in the art will understand that all such discussions, including claims, embodiments, drawings, charts and equations, that use distance applies also to angular measure such as radians. Distance, such as millimeters, is most applicable in systems using Cartesian coordinate systems. Radians are most applicable in systems using at least one rotational axis. When a motor with a rotating rotor is used in a mechanical system, whether the final motion is linear or angular, it may be convenient to do computations in units of radians or degrees, rather than distance. Note also that such measurements may be absolute or relative. For example, a unit of distance may actually be a phase angle or a relative offset phase angle of a motor shaft. Because many rotations of a rotor shaft are translated to an ultimate angle or distance, such phase numbers will cycle repeatedly. Those trained in the art will understand that there are no limitations implied in discussions, including claims, embodiments, drawings, charts and equations, when these are applied to embodiments that use phase or some other repeating units of measurement. As one example, an "increase in distance" may actually require multiple cycles of phase angles where the phase angles naturally are both positive and negative during such cycles.

For non-mechanical systems, equivalent or workably equivalent units of measurement must be used. Such units might be focal length of a camera, a light intensity, a temperature, a percentage of population infected, measured health parameter of a patient, or a metric related to genes or target behavior of an organism.

One advantage of an embodiment is the iterative computation using a numerical "jerk" is more computationally efficient than prior art, which in turn allows lower cost processors, higher speed operation, or both.

A second advantage of this embodiment is that the use of real-time mechanical feedback improves accuracy of the tool head motions at the work piece (or at the mechanical system's feedback points), which in turn improves the accuracy of the finished work piece being machined. Such a difference is an improvement over the prior art.

A third advantage of this embodiment is that it is independent of widely varying "spring-mass-damping" parameters of the combined mechanical system and work-piece. That is, it is not necessary to simulate the physics of the complex tool plus work-piece system, as required in some prior art. In many cases, the necessary physical parameters, in particular the "spring-mass-damping" parameters, in three or more dimensions (not including cross-dimensional effects), are effectively impossible to know either in advance of machining, or to realistically measure during machining. As one example, consider a 3D work piece being built up on a moving platform. As the size of the work piece increases, the weight increases. Likely, the platform is stiffer than the work piece, and there are also motors and intermediate components, such as belts. Thus, the complete physical modeling of the motor, drive-system, platform, and work piece are not only extremely complex, they change during work piece position and build. In addition, different platform positions, and different tool positions have dramatically different spring-mass-damping parameters, too. That is, the necessary parameters for modeling the complete system change rapidly during tool and work piece motion. In addition, as if those problems are not enough, a work piece being built by additive manufacturing, for example, has material that starts soft, and then becomes more rigid as it cools or cures.

In practice, then, it is not effectively possible to either model in advance of machining, or to measure and model dynamically during machining, the spring-mass-damping parameters of the combined mechanical system and work piece system so as to be able to computationally correct from idealized move instructions, via the motion engine, to motor drive signals.

An embodiment avoids all such spring-mass-damping modeling requirements by measuring in real-time the actual mechanical system positions, and correcting, effectively, on each (or some) iteration(s), both the computations and motor drive signals to get the tool head where it should be to reach the desired waypoint at the desired velocity.

One embodiment measures the location of a moving platform in real-time. One embodiment measures the location of two moving platforms in real-time. One embodiment corrects for measured platform tilt. One embodiment corrects for the interaction between two or more axes.

Some embodiments synchronize motion between multiple axes. This may be done during the optimization of computed estimated-time-of-arrival, ETA, or optimization of most linear velocity ramp. Here, velocity ramp is the sequence of velocity values during a move from a starting position to a waypoint, such as from one waypoint to the next waypoint. One method of synchronizing multiple axes is to compute an ETA for axis separately for a combined (multi-axis) move, then take the worst-case, that is the longest ETA, and use that as the ETA for each axis.

One embodiment measures the locations of moving platforms by measuring the rotational position of a motor shaft at the motor shaft. One embodiment uses a direct drive, free of any gears, belts, pulleys, chains, capstans, drive screws, and the like, between the drive motor shaft and the platform. That is, the angle of the platform is the same as the shaft angle of the drive motor within the mechanical tolerances of this direct drive, such as motor shaft or platform twist under a torsional load. One embodiment uses two rotational platforms in an inverted SCARA configuration. One embodiment uses a stepping motor for direct drive of each of the two SCARA axes. One embodiment drives the stepping motor with sine wave simulated voltage/current waveforms to achieve sub-step positions. One embodiment drives a stepping motor with offset magnetic field angle, shaft angle offset, torque or magnetic field strength offset to directly implement a desired acceleration within the motor itself. Drive electronics, such as amplifiers or pulse-width-modulators (PWM) may be used between computed acceleration values and the actual motor wires.

For some such embodiments, platform tilt or axis non-orthogonality may be measured either statically or in real-time during machining, and then corrected by adjustments to iteration outputs, waypoints, moves and paths. Typically alternations to waypoints or moves are a preferred way to implement such corrections.

We use as examples herein tool head position, platforms, parts, work pieces, 3D printers, additive manufacturing, and other examples as examples only. The methods, devices and systems claimed are, in some embodiments not restricted to additive machining, or to machining at all, or to rotating platforms, or to moving platforms at all. Embodiments are not restricted by number of axes. Drive may be for one axis, two axes, three axes, four axes, five axes or six axes. Drive of more than one axis may be integrated in a single controller and single method loop, or may be through separate but cooperating motion engines, one per axis, or may use fully independent motion engines for each axis. Also, whether a tool head moves and the work piece is (relative to the tool head at that instant) still, or the tool head is still (at that instant) and the work piece moves is not relevant to the claims. As those trained in the art know, moving one over the other depends on the specific type of mechanical system and the step or motion being executed.

One example of an integrated controller or motion engine is the computation of "speed," which is typically comprised of motions in more than one axis. As will be seen below in equations for modules or elements, speed is useful for computing arrival time at the end of a move and computing the deposit rate of material in an additive manufacturing machine (and speed of a cutting tool on a work piece in a subtractive manufacturing machine), the well as having other computational and practical benefits.

Core embodiments use a computational element called a "planner" that accepts as input move instructions, such as G-code, and generally divides the individual move instructions into (sometimes many) sub-steps, called waypoints. Waypoints have a position and velocity. An optional next computational element is called an "acceleration optimizer." This element verifies, or adjusts as necessary, the waypoint locations, waypoint velocities, or both, to stay within the physically possible (or specified) limits of the mechanical system or work piece being tooled. The output of the acceleration optimizer may be though of as "waypoints with reality-adjusted velocities." See FIG. 11.

Of note, with a few exceptions as noted elsewhere herein, using these novel closed-loop embodiments often does not require altering waypoints to stay within predetermined physical limits of a machine. Such limits are often set by open loop determinations and then set to avoid any type of "failure," such as missed steps in a stepping motor. The inherent feedback at the level of the iterations measures that actual motion and velocity of the system, and thus any machine limits, such as a maximum machining rate based on motor power and tool-head load, are inherently accounted for. That is, one may view such embodiments as running the mechanical system, "full out"—at whatever maximum performance it can actually achieve in real-time.

Core embodiments next have a computational element called a "real-time actuator controller." Methods of embodiments are executed within this element. This element also incorporates the real-time positional (e.g., rotational) feedback from the device, and so by definition it operates in real-time. Note that all prior ("upstream") elements may do their computation in advance of actual machine motion, or "off-line." However, they may also execute in real-time. They may also operate in a hybrid "pre-computation" and real-time mode, such as keeping an input queue to the real-time actuator controller from becoming empty. That is, they compute "on demand" or "just in time." Their computations and optionally the computational hardware (e.g., a physical processor) may be fully integrated into the real-time actuator controller. In one embodiment, data passing from the move instructions, through the planner through the acceleration optimizer into the real-time actuator controller is managed as queues, essentially driven by the rate at which the real-time actuator controller operates.

In one embodiment, moves are in straight lines. That is, any curves are broken into a suitable number of sub-moves, each of which is a straight line. This simplifies computations.

Some embodiments comprise computation, as shown in Figures and claims. Embodiments of this invention implement the equations and steps as described in these Figures, and these Figures should be used in construing claims.

Let us consider an exemplary move from point A to point B. The mechanical system has a target velocity moving from A to B. Thus, one could take the distance from B to A, and the velocity, and easily compute the motor control commands for a constant velocity move from A to B. However, the tool head may be stopped at A, and cannot accelerate instantly to the target velocity. Also, there may be a very sharp turn at point B, so it is desirable to have the final speed at B be zero, not the maximum mechanical system velocity, to avoid overshooting B due to the spring-mass-damping parameters of the system. In practice, some machines may have, for varying reasons, a maximum velocity. However, an alternative model based on mechanics is that a machine has a maximum acceleration—a function primarily of motor torque and the moving mass—but not a maximum velocity per se. Two examples of a practical maximum velocity may be the rate at which material may be laid down in additive machining (e.g., 3D printing), or a preferred tool move rate to achieve a desired edge quality in subtractive machining.

In addition, A and B may be on a straight line in a Cartesian, X-Y-Z coordinate system, but are not on a straight line using rotating platforms in a SCARA arm configuration. Thus, as the points between A and B in a Cartesian system are translated to the motor positions for the rotational platform, additional directional and inertial changes are required. As the platters, tool head and work piece move, their absolute path of motion translated back into Cartesian coordinates will not be a straight line, due to the spring-mass-damping parameters, inertia, and other factors including tolerances.

Embodiments of this invention are free of a maximum velocity limitation, threshold or cap. Prior art often has to adjust or test a computed velocity to be sure it is within permitted bounds. Often such bounds are set manually, although they may be computed or be simply predetermined tables or constants. Similarly, embodiments of this invention are free of a maximum acceleration limitation, threshold or cap. Prior art often has to adjust or test a computed acceleration to be sure it is within permitted bounds. Often such bounds are set manually, although they may be computed or be simply predetermined tables or constants.

In practice, it may be desirable to in fact have some minimum or maximum velocity for a machine head. However, such limitations may come from a "planner," "parser," "move generator," "profile generator," CAM (Computer Aided Machining) program, or other "upstream" computation or data source of the motion control methods of this invention. For example, a planner might take a long path, perhaps from a g-code file, and break it up into a series of moves defined by the start, end and intermediate waypoints. The planner may set a desired velocity for the start and end of the path, and for each intermediate waypoint. Note these are not necessarily "maximum" (or minimum) velocities, but rather "target" velocities at the waypoints. If the planner wishes to achieve maximally sharp corners, it may set the start and end target velocities to zero, for example. As an alternative example, an additive manufacturing machine may wish to have a constant feed rate, or a feed rate within predestined bounds. In this example, the velocity at the corners, such as the start and end of path, will be set by the planner to a minimum but non-zero target velocity.

What embodiments of this invention do is, "keep their eye on point B," Independent of the original starting point, point A. The Iterative Jerk Method considers only the current location of the tool head and point B, including the target velocity at point B. The tool head keeps getting closer to point B, but the exact path that happens is essentially a "don't care" to the Iterative Jerk Method. At each iteration, it computes the best jerk, acceleration, velocity and position to get the tool head to point B at the target velocity, given only the current, real-time position and velocity.

Of course, we typically discuss one dimension at a time, but for most applications there are two or more axes being controlled together. Therefore, velocity, for example, is a vector, not a scalar. (As are jerk, acceleration, and position, and various target, limit, and tolerance parameters.)

A waypoint or target position or target velocity may be viewed as "complete" when the real-time feedback, or computed information, or both, places the known or expected tool head position within an acceptable tolerance of the target. One such way to know that the iterations to waypoint are complete is that there is not sufficient time to complete the next iteration. Note that position by itself is insufficient to consider that "final position" has been reached. A tool head might well fly through a target position at high speed, overshooting. The Iterative Jerk Method will provide the control output necessary to move the tool head back to the target position and also to reach the target velocity, which might be zero, or even a negative velocity.

Another method to determine when a waypoint has been "reached," that is, a "terminating condition" for the current move, is when some parameter becomes out of range. In particular if a computed jerk or acceleration is too large, either positive or negative, the method is essentially complete. Movement to next waypoint may be started immediately. Or, alternatively, the system may be allowed to "coast" through (i) the estimated time of arrival (ETA), or (ii) the target position has been reached or passed, or within a given tolerance, or (iii) the target velocity has been reached, or passed, or within a given tolerance. Such "terminating conditions" may be combined, as either an OR combination, or an AND combination or a WEIGHTED combination. "Coasting" to the terminating condition typically involves maintaining the current velocity or the current acceleration, or a combination. In practice, different termination conditions and the method of coasting have little impact on system performance. This is primarily because alteration of the last one or two iterations of the Iterative Jerk Method is simply too little time and too little change to device movement to impact final performance or final quality of a workpiece.

In one embodiment, when a termination condition has been reached the next waypoint immediately becomes the next target and the Iterative Jerk Method immediately starts on that move.

In one embodiment a path to a waypoint is broken into a series of time intervals. When no more time intervals remain, that waypoint is considered completed.

In one embodiment a path to a waypoint is modeled as a linear velocity ramp. In one embodiment, parameters within the iteration equation are optimized to generate the most linear velocity ramp. A key parameter to optimize is the estimated time of arrival, or ETA. Optimizing ETA prior to a move, via an optimizing step or simulation is claimed as an embodiment or as part of embodiments. A second parameter that may be optimized is the loop time. (Or, for an analog implementation, loop bandwidth or parameters that affect loop bandwidth.)

In some embodiments an optimization step is performed prior to the real-time iteration steps. The optimization step may be performed free of any real-time data from the machine or object under control, however, it may use known static parameters of the machine and/or object being machined. The optimization step may, however, update or be updated from time to time with changing "static" parameters. For example, new static parameters may be measured or computed based on a time interval, such as every 1, 5, 10, 15, or 30 seconds, or every 1, 5, 10, 15, 30 or 60 minutes, or another time interval. As another example, new static parameters may be measured or computed based on likely or expected changes to those parameters, such as a change in the machine or a change in the object being machined. For example, a different cutting tool head, or different additive material or head; or the object changing weight, proportions, springiness, or delicacy.

Optimization of "most linear" velocity ramp during a move may be computed by any one of many optimization algorithms known in the art. For example, least squares fit to a straight line; minimization of difference between minimum and maximum deviation from a straight line, minimization of number of inflection points, minimization of areas between a computed path and a straight line, or other algorithm. Such algorithms may be closed form, or use iterative, Monte Carlo, simulated annealing, or another computational method. Machine learning or AI methods may be used to compute a most linear velocity ramp. A move may be segmented and each segment optimized separately or in aggregate.

In some embodiments, the ETA, or tt, is not updated between the start and end of a move controlled by an iterative, real-time method of an embodiment.

In additive manufacturing, such as 3D printing, there is often an optimized feed rate of material. That means there is an ideal velocity of the print head over the object. While velocities faster than that may or may not be within the mechanical system's mechanical capabilities, slower velocities result in too much material being printed. There may well be an effective minimum material feed rate. Therefore, in some situations the ideal tool motion is indeed to overshoot a target position, then as fast as possible travel back through the target position at a reverse velocity. In this way, the feed rate of material is never less than minimum desired federate, although it might be zero during the overshoot.

Similar issues also apply to subtractive machining and other machining operations. Similar issues also apply to motion system that are not machining. For example, consider a robot motorcycle. The motorcycle has a minimum speed necessary to avoid tipping over. If the motorcycle is moving through an obstacle course, it is better to be off from an ideal position if it means maintaining a minimum speed.

In summary, embodiments continually consider current position and speed of the tool head in conjunction with the target position and target speed to compute output controls, independent of how the tool got to its current position and speed.

In one embodiment, a 3D printer uses two rotational platforms arranged in an inverted SCARA arm. In one embodiment a lambda motor rotates a work piece platform around a lambda axis while a parallel and offset theta motor rotates the lambda motor and work piece platform around a parallel and offset theta axis. The two motors move the work piece so that the portion of the work piece under the print head can be moved to any point in a plane, within the working area, or planar tool range area, of the printer. Each plane of the work piece is printed, then the print head moves up, and the next plane of the work piece is printed. In one embodiment stepping motors are used as the lambda and theta motors. The shaft of the stepping motor is directly connected to the platform, thus the platform rotational angle is the same as the motor shaft. Rotational sensors are used at the motor shaft to provide real-time feedback of shaft angle. Because the mechanical paths from the motors to the platform are stiff, these sensors provide an accurate measure of the real-time location of the platform. Note that the print head is effectively fixed or each plane printed. For a work piece being constructed that is low to the platform, these sensors then also provide an accurate location of the spot on the work piece under the print head. Note than when we speak general of "tool position" or "tool head," for this mechanical system configuration, we are actually referring to the spot on the work piece under the print head. As the work piece is constructed, and becomes higher on the platforms, real-time accuracy will degrade because the work piece is not perfectly rigid, has some springiness to it, and also changes shape in response to temperature, curing and other factors. However, some of these factors may be computed in advance, and so, as the work piece being constructed becomes higher off the platforms, the logic, methods and steps in some embodiments, including both the acceleration optimizer and the real-time actuator controller may take these computed parameters into consideration. For example, maximum velocity and maximum acceleration may be reduced, and also dwell time can be added at points of zero velocity (to allow, in essence, the work piece to completely stop moving).

The combination of the platform being directly connected to the drive motor shafts, with real-time position sensors on the motor shafts, with the Iterative Jerk Method, provides an unexpected benefit in the claimed combinations. Such position feedback permits higher accuracy manufacturing. However, feedback on the motors on traditional 3D printers, as well as on other manufacturing equipment, is ineffective because most of the error is between the motor and the work piece or the tool head. Traditional controllers, if they benefit at all from feedback, use the feedback to maintain a fixed target motor velocity during a move—not to provide multiple, continual, changing, motor drive outputs updates within a single move, as some of our claimed embodiments.

Traditional mechanical system feedback has been used to "achieve a fixed desired velocity" or to "achieve a fixed desired position," for one move, but not to change either of these two target parameters during a move. The Iterative Jerk Method, distinctly different that motion feedback prior art, uses the feedback to create changing motor control outputs during a move.

In one embodiment, there is a curved slot in one of the rotational platform, which is penetrated by a shaft drive the second platform. In this slot is a damping material or element, such as a friction surface, such as a plastic. This damping may be used as a damper in the "spring-mass-damping" physical model of the rotational platforms including either or both of the lambda and theta moving subsystems. This is a novel location to place such one or more damping elements in an inverted SCARA arm configuration. In some embodiments, the less friction the better.

Key embodiments are free of "history" of a move or path. Such history in the prior art is often implemented by one or more integration terms in an iterative motion control feedback loop; for example, the "I" integration term in PID controllers.

Unless stated otherwise, exemplary units of measure herein are millimeters (mm) for distance; mm per second (mm/s) for velocity or speed; seconds (s) for time; $mm/(s^2)$ for acceleration; and $mm/(s^3)$ for jerk. In other embodiments or application such units may be different. There are no limitations to units of measure or values of constants, variables or examples, in the claimed breadth and scope of applications, embodiments, claims or inventions, unless explicitly stated.

Key embodiments of the iterative real-time motion control method are that the methods output only acceleration (for each axis under control). That is, an embodiment is free of both output position and output velocity. Similarly, in key embodiments, the iterative real-time motion control method does not compute either a target position or target velocity. Rather, for each move, the iterative real-time motion control method takes as input (e.g., to a waypoint) a fixed target position and target velocity. These fixed target position and target velocity do not change during the execution of the iterative real-time motion control method over the course of one motion to a waypoint. In addition, the iterative real-time motion control method takes as input for each iteration current position and current velocity. One might view such starting points as "history" from the viewpoint of the computation in the current iteration in the method. They are, ideally, the "most recent" position and velocity just at the start of each iteration.

As those trained in the art of stepper motors know, there are three broad methods of driving a stepper motor. "Whole steps" are achieved by turning one set of coils fully on while turning adjacent sets of coils fully off. For a rotating stepping motor, these waveforms are roughly out-of-phase square waves, where one full 360° of the driving waveform is four full steps. "Micro-step" motion is achieved by providing discreet intermediate voltage/currents to adjacent coils. For a rotating stepping motor, these waveforms are roughly out-of-phase (by 90°, typically) stair-steps. "Sine wave" drive, (which may also be called "simulated sine wave drive") provides fully continuous intermediate currents to adjacent coils. For a rotating stepping motor, these waveforms are roughly out-of-phase sine waves. A "simulated sine wave" is a term sometimes used when the generation of the sine wave amplitudes is digital, for example from a digital-to-analog (D/A or DA) converter or from a pulse-width-modulated (PWM) output. Hybrid combination drives are also used. Embodiments use all of these possible low-level drive circuits between the motion engine or motor controller electronics and the motor itself, or the motor driver (such as a power amplifier). Some embodiments specifically claim simulated sine wave drive as this drive provides a high degree of sub-step positional accuracy, particularly in a direct drive system. Also, simulated sine wave drive is audibly quieter and importantly does not generate mechanical impulses to the system, as do other stepper motor drive methods.

Some embodiments use a modified simulated sine wave drive that may be comprised of additive components of both a square wave shape and a sine wave shape. Optionally, the square wave shape may be modified by smoothing corners or instantaneous changes to the square wave amplitude.

FIGS. 2 and 3 shows an optional module, 104 and 174 respectively, a forcing function. The purpose of this module is to correct for non-linearities in a system. For example, a forcing function may convert an acceleration (or torque) in a coil current value for a motor. The relationship between torque and coil current is not linear. By using the forcing function the output 82 of module 81 is the input to the system or process 71. This feedback value 82 may permit the system or process to be linear itself, or perform no computations at all. For example, the system or process 71 may be nothing more a motor and a position sensor. (In this example, the current velocity and current acceleration are either computed from sequential position measurements or measured by other sensors.) The system or process 71 may be inherently "dumb," such as multiplying bacteria, a football in an arc in the air, or genetic mutations.

A parameter of embodiments is ETA, or estimated time of arrival at the next waypoint sometimes identified as tt. If velocity is approximately constant during the entire move from the current state to the next waypoint the ETA may be estimated as simply distance divided by velocity. If acceleration is estimated to be constant the ETA is similarly easy to estimate computationally. However, in many cases the ETA is not so easy to estimate or compute. In some embodiments the eta is computed by an optimization algorithm that adjusts plausible ETAs, then runs a simulation of the move to the next waypoint. Such simulations may be similar to the spreadsheets discussed above. The goal of the simulations is to find the most linear velocity ramp. The "best" ETA is the one that produces the most linear velocity ramp. There are many different ways to compute the most linear velocity ramp, as those trained in the art appreciate. For example, a least-squares fit to a straight line.

Note that in general, the longer the ETA the slower the system moves to reach the target waypoint. Therefore, typically, lower accelerations are required. In many real-world applications, such as machining, a basic goal is to complete a task as rapidly as possible. Therefore, for such applications, the shortest possible ETA is the best one. Other applications have limits such as acceleration or velocity limits. For these, the shortest ETA within those limits is the best one. In yet other applications, an ETA is already known. For example, consider a train that has a preset time it is supposed to enter a train station. As another example, a football may be thrown in a football game. It is not difficult to determine from the start of the flight of the ball what the likely ETA is for it to be caught or hit the field. In yet another example, dancers on a stage may be performing a known routine. Thus, locations of dancers and the choreography are easy to predict: The end of a dance sequence is known.

Patentability Over Prior Art

Prior art includes, U.S. Pat. No. 5,770,829A, "Katz"; U.S. Pat. No. 9,041,337B2, "Tian"; US20130197688A "Egi"; U.S. Pat. No. 4,769,583A, "Goor"; U.S. Pat. No. 5,569,995A, "Kasaka"; and US720895B2, "Marcinkiewicz."

Embodiments of this invention are patentable over Katz due to the following differences. Katz outputs both position and velocity from his iterative real-time method; he does not output acceleration. Embodiments of this invention output acceleration only, not position or velocity.

This difference may be viewed in Katz in his FIG. 3 and his col 1, lines 56-59; " . . . used to determine . . . the electric currents that are to be generated in the motor windings for moving the armature to the correct position." Embodiments of this invention are free of Katz's steps, "determined new commanded velocity" and "determined new commanded position." That is, Katz's control loop is conventional in that it outputs desired position to a motor controller.

Another difference is that Katz is silent on the topics of optimizing an ETA and optimizing for a most-linear velocity ramp between waypoints. He says only, "information from the supervisory subsystem is utilized by the profile generator to determine a desired target position. (col 1, lines 52-54) He does not explain any motivation or method for such determination.

Yet another difference is that Katz does not teach multiple axes or synchronizing between axes. Indeed, the word, "axes" appears nowhere in Katz.

Finally, Katz does not teach the specific computational method steps shown in Embodiment 101 below.

Embodiments of this invention are patentable over Tian due to the following differences. Tian describes a "profile generator [that] can create the motion profile to conform to a set of motion constraints provide by the user." (abstract). Embodiments of this invention are free of the "constraints," such as maximum velocity, that are fundamental to Tian's invention. Tian lists five constraints that are inputs to his profile generator, in FIG. 4: "sample time, velocity limit, acceleration limit, deceleration limit, and jerk limit." Embodiments of this invention are free of all five of Tian's constraints. Tian's constraints are all user provided.

Another difference is that Tian uses either a new position or a new velocity for his target; he cannot use both a position and velocity (box 1104, FIG. 11), as do embodiments of this invention.

Yet another difference is that Tian's method is not real-time. Rather, he computes his motion "profile" in advance of actual motion (box 1108, FIG. 11). Therefore, his invention does not use current position, current velocity, or current acceleration, as do embodiments of this invention. Tian does not use or teach a method that is real-time (box 1106 in FIG. 11). Tian does not use or teach a method that uses actual position or velocity as feedback in an iteration. Rather, he iterates only in a non-real-time loop whose input is "profile segment durations multiples of sample time" (box 1208, FIG. 12).

Yet another difference is that Tian is silent on the topics of optimizing an ETA and optimizing for a most-linear velocity ramp between waypoints. Tian is silent on computing ETA, and also silent on the topic of optimization. In fact, Tian teaches away from linear velocity ramps. Rather he shows smoothly varying, or curved velocity ramps in FIGS. 9 and 10.

Yet another difference is that Tian does not teach multiple axes or synchronizing between axes. Indeed, the word, "axes" appears nowhere in Tian.

Yet another difference is Tian must break his move into "segments." Embodiments of this invention are free of such segments, but rather execute moves as a single computational action from one waypoint all the way to the next waypoint. Note that Tian's "segments" are neither waypoints nor iterations to get to waypoints.

Yet another difference is that Tian's "acceleration" is merely basic physics as a result from his motions. That is, he shows and describes "acceleration," as simple physics, but use of acceleration in a control method is not part of his invention or teachings.

Embodiments of this invention create a move with ETA and velocity profile first (non-real time, ahead of actual move), and then use the iterative jerk method in real time during the move. Tian, in essence, simply "takes what he gets" in an actual path from his generation of his "profile," in advance of the move.

Finally, Tian does not teach the specific computational method steps shown in Embodiment 101 below.

Embodiments of this invention are patentable over Egi due to the following differences. Egi outputs target position; he does not output acceleration. In fact, he actually outputs "error pulses, P1, P2 and P3" (FIGS. 14, 308 and 309). Egi also says, "said movable unit is moved by said remaining distance" (claim 1). Embodiments of our claimed invention output acceleration only, not position or velocity.

Another difference is that Egi limits both jerk and acceleration (FIG. 15, S103 and S105) in his real-time control loop. Embodiments of our invention are free from such limits.

Another difference is that Egi uses only current position in his real-time control loop (FIG. 16, S81). Embodiments of our invention use both current position and current velocity in the iterative real-time control method. Egi's use of only current position makes his system intolerant of dynamic system changes as these may produce large position error terms resulting in high acceleration and jerkiness.

Yet another difference is that Egi teaches only use of position for both start and end of moves. He does not teach using velocity either as a starting parameter or as an ending parameter of a move.

Yet another difference is that Egi teaches re-computing the distance to his target on every computational iteration. This is computational expensive. Embodiments of the current invention are free of such computation in the iteration method. Indeed, embodiments do not need to re-compute distance due (i) to the nature of method, and (ii) advanced optimization of velocity linearity during the move, prior to the start of the iterative real-time method.

Yet another difference is that Egi teaches computing a difference (deviation) between a current position and a position in an "ideal" path. Embodiments of this invention are free of sensing or using such a position deviation from an "ideal" path. Rather, embodiments consider the target position and velocity. The methods are "don't care" about any such deviation from an ideal path. Thus, Egi cannot compensate for any actions or characteristic of his moving system. Since current embodiments consider only reaching the target, these current embodiments inherently correct for any actions or characteristics along the way to the target.

Yet another difference is that Egi teaches comparing to and limiting to a maximum acceleration. Embodiments of this invention are free of such limitations in the methods. One unexpected benefit of such freedom is better optimization and performance. Egi must limit acceleration to static value. Since current embodiments have no such static limit, they may use acceleration higher than Egi's limit. This benefit provides faster machining, for example.

Yet another limitation is that the performance of Egi's methods and machines is limited by having to move towards a precomputed "ideal" path. Such motion is not directly related to reaching the target. Whereas, embodiment of our invention do not have to move "sideways," as it were, but rather continue optimally directly towards the target position and target velocity.

Yet another difference is that Egi is silent on the topics of optimizing an ETA and optimizing for a most-linear velocity ramp between waypoints. Egi is silent on computing ETA, and also silent on the topic of optimization. In fact, Egi teaches away from linear velocity ramps. Rather he shows significantly and intentionally varying velocities (his FIG. 17).

Although Egi talks about a "plurality of drive shafts" he does not teach any method of synchronizing between these. Since Egi suggests, "three shafts or six shafts" [0060], it is reasonable to assume that his system is likely to have significant position errors and also require synchronization for reasonable performance.

Finally, Egi does not teach the specific computational method steps shown in Embodiment 101 below.

Embodiments of this invention are patentable over Goor due to the following differences. Goor does not teach any start or target velocity other than zero (FIG. 24b, FIG. 25b). Embodiments of this invention use variable starting and ending velocities.

Another difference is that Goor uses only position in his real-time iterative control loop (FIGS. 30, 104 and 106). Embodiments of this invention use both current position and current velocity in the iterative real-time control method.

Yet another difference is that Goor teaches a control loop with a great deal of "history." His move history is in the form of integration steps. His FIG. 29 shows five separate integration steps. Embodiments of this invention are free of move history. Goor's extensive integration terms likely create instabilities in implementations of his invention.

Another difference is that Goor teaches completing moves within a minimum time; his velocities are highly variable during a move (FIG. 24b, FIG. 25b). Embodiments of this invention optimize moves for a linear velocity ramp.

Yet another difference is that Goor teaches only a "bang bang" controller for jerk. (FIG. 24d, FIG. 25d) and "time T can be minimized with a bang-bang control of y''''" (col 3, lines 56-57) Goor teaches away from a variable jerk value, as used in embodiments of this invention, consistently. For example, his equations in col 3 through col 14 all assume a bang-bang (that is, only on or off) value for jerk. As one in the art knows, a "bang-bang" controller inherently generates vibration, noise, oscillation, other undesirable and secondary motions, wear, and other negative results, as compared to the "smooth" acceleration of embodiments of this invention. Indeed, optimizing for most linear velocity change on a move is closely related to smoothest acceleration—in fact, in an ideal case, constant acceleration. Goor not only teaches away, his bang-bang controller is the opposite of smooth acceleration.

Yet another difference is that Goor teaches "minimum time" for moves, rather than "linearized velocity." Since these two are both different and incompatible goals and processes, Goor is clearly teaching away from claimed embodiments.

Yet another difference is that Goor teaches outputting current to his motor armature. Embodiments of this invention output acceleration to the motor controller. So, Goor ignores non-linearities, dead points, and limits of his motor. Whereas, embodiments of this inherently take into account such motor characteristics my maintaining a desired acceleration directly. In one sense, "motor current" has no direct relationship to the physics of the system being controlled. Acceleration does have a direct impact. Thus, unexpected benefits of using acceleration rather than armature current are more efficient use of motor capability, higher system performance, the ability to handle a wider variety of motors, less dependency on specific motor characteristics, and other benefits.

Yet another difference is that Goor does not teach multiple axes or synchronizing between axes. Indeed, the word, "axes" appears nowhere in Goor.

Goor does not teach the specific computational method steps described in claims and embodiments.

Kusaka teaches a motor control algorithm that accepts as input a torque and computes motor currents responsive to a battery voltage. Kusaka does not teach a method of moving from one point to a next waypoint. Kusaka's invention might be the "motor controller" to which embodiments of this invention output a torque. Kusaka does not teach a method of computing a torque, nor a control system with variable speed, nor an iterative control system to achieve both a target position and a target.

Marcinkiewicz teaches a method that, like Kusaka, accepts as input a torque and computes motor currents. Marcinkiewicz improved "torque stability" for a motor with a "predetermined speed value." Marcinkiewicz does not teach a method of moving from one point to a next waypoint, nor a control system with variable speed, nor an iterative control system to achieve both a target position and a target.

Notes on Claims

Notes below refer to claims numbered as original filed. Claim numbers as granted may not have the same numbers. Text below is non-limiting. It is provide to aid in understanding exemplary scenarios or embodiments. Notes below may be used to construe claims limiting claim scope only when necessary for a claim to be valid under 35 U.S.C. § 112.

Claim 1—describes the basic iterative method and equation for motion control.

Claim 2—in a preferred embodiment, acceleration is computed from the computed jerk value, as compared to a direct, real-time measurement, such as from a sensor. Embodiments include replacing the integral with a multiplication: current acceleration=previous acceleration plus [(current jerk plus previous jerk) times iteration-time-interval] divided by two. Embodiments include this formula where the previous acceleration is set to zero.

Claim 3—Velocity is computed from the acceleration, as compared to a direct, real-time measurement, such as from a sensor. Embodiments include replacing the integral with a multiplication: current velocity=previous velocity plus [(current acceleration plus previous acceleration) times iteration-time-interval] divided by two. Embodiments include computing the velocity from changes in real-time position. Computing velocity may be used for simulations, in place of real-time data if real-time is not available, out of range, not trusted, or noisy. Computed velocity may be combined with real-time velocity as a way to reduce noise.

Claim 4—Position is computed from the velocity, as compared to a direct, real-time measurement, such as from a sensor. Embodiments include replacing the integral with a multiplication: current position=previous position plus [(current velocity plus previous velocity) times iteration-time-interval] divided by two. A preferred embodiment is accepting position from a real-time position sensor. Computing position may be used for simulations, in place of real-time data if real-time is not available, out of range, not trusted, or noisy. Computed position may be combined with real-time position as a way to reduce noise. Computed position may be compared with real-time measured position as a method to detect errors, such as stuck or jammed machine, excessive friction, motor failure, and the like. Position is computed for the spreadsheet Figures.

Claim 5—any of position, velocity or acceleration may be from one or more real-time sensors, either directly or indirectly. Preferred embodiments use current position, velocity and acceleration from real-time sensors. Real-time data from single real-time sensor, such as position or velocity, may be used to compute the other parameters. Embodiments include using a non-linear lookup table, or function, that corrects real-time data to produce more accurate position data. Such an embodiment may use real-time data as an input and corrected position as an output. Such an embodiment may use multiple or multi-dimensional tables or formulas that include velocity, position or other state information as inputs or selectors. Embodiments include a non-linear table with an input or state information including a step position in a stepper motor. Embodiments include a non-linear table with an input or state information phase between two steps in a stepper motor. Embodiments include averaging, smoothing, bounds or error checking any such data. Embodiments include generation of any such tables from actual measurement or calibration of a device controlled by the motion controller.

Claims 6 and 7—Position comes from a real-time sensor, either directly or indirectly. All alternative embodiments for claim 5, above, apply also as alternative embodiments to claims 6 and 7. These claims also refer to a position sensor directly or indirectly on a shaft, such as directly on a motor shaft, such as on a stepper motor, or directly on a shaft directly driving a SCARA platform or table. The claim also refers to a sensor resolution higher than a fraction of a step. A preferred embodiment is a shaft angular position resolution in the range of $\frac{1}{200}$ step to $\frac{1}{4}$ step. An exemplary embodiment is a resolution of 4000 for a full shaft rotation. A hall effect sensor may be used as such a sensor. Such a sensor may be differential, or have two, three, four or more hall-effect sensors integrated into a single sensor.

Claim 8—An important novelty is that the method is free of steps or elements that provide a position as an output or feedback parameter.

Claim 9—An important novelty is that the method is free of steps or elements that provide either position or velocity as an output or feedback parameter.

Claim 9—In practice, an embodiment "gets close to" a target endpoint position and velocity, but does reach perfect numerical targets for various real-world reasons, such accuracy of sensors or limitations of a machine or workpiece. When a move is sufficiently close to a target endpoint, for either position or velocity values, embodiments end the current move and now iterate to the next waypoint. One method of detecting such "closeness" is when either p1 or v1 are within a bound of the ideal target, or that the computed time to reach the target endpoint, tt, is within a time range near zero.

Claim 10—In practice, as an application "gets close to" a target waypoint position and velocity, computations of a method of an embodiment may generate very large positive or negative values of jerk, acceleration or velocity. Or, the remaining time, tt, may be less than one iteration interval ts, zero, close to zero, or negative. One endpoint condition is when the position is within a range of a target pt. Another endpoint condition is when both the position and velocity are both within respective ranges of the target pt and vt. An embodiment includes multiple axes where all axes must be within a range of each axis' respective pt. One endpoint condition is that some combination of computed j, a or v is outside an acceptable, respective range. In practice, when close to the target waypoint, the computed terms j and a, in particular, tend to "blow up." Embodiments include these, and other conditions, that may be used to detect or determine an endpoint condition.

Claim 11—parameter tt is an "estimated-time-of-arrival," measured as time interval from the current time, either computed in advance or real-time, to the completion of the current move. Estimating tt is an important and novel step of embodiments. We refer to "estimating," rather than "computing," because the exact moment of reaching the desired endpoint position and velocity depends on how precisely a practical determination of such is determined. However, embodiments include exact computation from a closed form computation, from an iteration, from simulation, or from optimization.

Claim 12—tt may be estimated or computed from an optimization step where the goal of the optimization is a most linear velocity ramp, sequence or profile, such as from a simulation of a move from a current position and velocity to a target position and velocity. Methods of optimization are known in the art and discussed elsewhere herein.

Claim 13—The constants, c, d and e, ideally have values of 6, 4 and 3 respectively. Variations in these values, however, may not be used for infringement purposes as some such variations will still produce an effective implementation. Such variations are well within the proper legal definition of the "rule of equivalents" for determining infringement. This claim makes explicit that any such tweaking, or other similar types of tweaking or introduction of minor errors or artifacts, is in fact within claimed scope.

Claim 14—describes the constants c, d and e having exactly their each ideal values.

Claim 15—describes embodiments of endpoint conditions.

Claim 16—describes use of a method of an embodiment to control a machine tool that uses an inverted SCARA arm. Embodiments include non-inverted SCARA arms, and machine tools of one, two, three, four, five, six and more axes, where two or more axes move simultaneously, each under control of a claimed method.

Claim 17—An important and novel embodiment is the use of described methods on more than one axes simultaneously. Since a machine tool head can be in only one place at one time, iterations for moves in each axis must end at the same time. One embodiment computes desirable arrival time tt for each axis separately, then selected the arrival time tt to then use of all axes.

Claim 18—An ideal motor or actuator produces a torque or force linear with an applied input. In practice, most motors are not so linear with an applied current, voltage or, for stepper motors, and inter-step phase angle. In addition, a stepper motor, which nominally also provides an angular position linear with a step number, is not perfectly linear in position, either. This claim describes a method and device comprising a non-linear correction table that takes as input a desired acceleration, or motor torque, and outputs a value that directly or indirectly becomes at least one motor current for at least one motor coil. Intermediate elements between the table and a physical motor or actuator may include conversion to phases for multi-phase motors, including stepper motors, amplifiers, modulators including pulse-width-modulation (PWM), drivers, and additional lookup, translation, linearization, and closed-loop control elements or steps. Embodiments include stepper motors, AC motors, DC motors, servo motors, permanent magnet motors, synchronous motors, induction motors, linear motors, piezo-electric transducers (PZT), voice coils, rail-guns, lights, mechanically moveable lenses, pumps and pressurizers, valves and other mechanical devices. Embodiments include lens actions: focus, auto-focus, focal length (zoom), pan, tilt, rotation (around the optical axis), color, and mechanically controllable spectral filtering. For this claim, use of a non-linear formula is included in the definition of table. Such a table may comprises state information and the table output may be responsive to such state information as calibration for a specific motor, motor position, motor velocity, motor load, rate of change of input or output of the table, and other state information.

Claim 19—Embodiments are specifically claimed for devices that implement any claim or method embodiment, including embodiments that include a controlled motor or actuator and embodiments that are adapted to control a motor or actuator.

Claim 20—Embodiments are specifically claimed for systems that implement any claim or method embodiment, including embodiments that include a motor or actuator and embodiments that are adapted to control a motor or actuator.

Definitions

Note on term usage—when discussing position, speed, velocity, torque and acceleration there may be apparent inconsistency of nomenclature. This is due in part because some terms, such position, are inherently used to describe a point in either one, two, or higher dimensions. Position is commonly used as either a scalar or vector. However, the term speed is generally a scalar while velocity is generally a vector. Like position, the term acceleration, in common usage, may also be either a scalar or a vector. In addition, acceleration is commonly used in the context of linear motion while torque is used in the context of rotational motion. Jerk is the derivative of acceleration, as either scalar or vector, and also as either linear or rotational motion. In addition, discussion, claims, embodiments or drawings that may apparently be referring to only a single axis or set of scalars, such may be extended to refer to multiple axes as parallel independent embodiments, or as synchronized motion between multiple axes. In addition, a wider control loop or predetermined profiles, may be operating on multiple axes, while multiple individual motor controllers are used for the individual axes, all within a single, larger, control loop. In addition, while "rotational position" or "rotational speed" might be used, generally the simpler terms "position" and "speed" are used. Thus, it is important that undue or restrictive interpretation of these terms not be used for construction of claims, embodiments, drawings or descriptions. Generally, the widest reasonable interpretation should be used, unless the context is clear or limitations are otherwise stated. This applies both to scalar v. vector, to linear v. rotational, and to signed v. unsigned.

"Acceleration"—velocity per unit time. See also "velocity" definition and note on term usage.

"Armature current", "armature voltage," "motor current," and "motor voltage"—are measured or measurable electrical signals at one or more motor coils. They may be a result of motor, machine and driver configuration and action, or they may be the output or intended output of a motor control, driver or modulator circuit that is attempting to drive the motor. They may be measured at the motor contacts, the motor coils, are outputs of a motor control, driver or modulator circuit. It is important to realize that such signals are not torque, acceleration or velocity. This paragraph is critical for proper construction of terms used in this patent application and in other teachings, examples, discussion, or publications.

"Build area"—refers to horizontal area on which an object may be printed, typically on the platter, for a 3D additive printer.

"Combination"—When the term "combination" is used to apply to a list of two or more elements, it means any one or more elements from the list. For example, a list of three elements has seven possible combinations.

"Controlled axis"—refers to an axis that is controllable to desired position, either a linear position or a rotary position, including a controlled velocity between positions, and excludes a continuous rotational axis, even if the rotational speed is variable, for example, a drill press or lathe rotational axis. The controllable desired position resolution should be comparable to the accuracy of desired feature size on a work piece on the machine.

"Endpoint condition"—any condition that causes an iteration to stop, including but not limited to an error condition, an over-range condition, or reaching a target or goal within predetermined limits.

"Jerk"—acceleration per unit time. See also "acceleration and "velocity" definitions and note on term usage.

"Mechanical System"—may be a machine, such as a subtractive machine tool, or an additive machine tool, such as a 3D printer. However, it may be a completely different mechanical system, such a vehicle or a portion of a vehicle. For example, a self-driving, or human controlled with a computation motion engine, such as a vehicle, drone, spacecraft, motorcycle or skier would also be an example of such a mechanical system. With respect to construing claims, "mechanical system" must be construed widely to include systems that behave as analogs to traditional mechanical systems, including all such systems that may be described with an equivalent position, first and second derivatives of that position, and a force equivalent that changes the first derivative.

"Planner"—in some embodiments a planner is a motion engine and vice versa. However, in some embodiments a motion engine comprises more computational elements than just the planner. See FIG. 5 and specification text for more information.

"Platform or build plate"—generally refers to a surface attached to the turntable (including attached by gravity) as an intermediate component between the turntable and the part. The part may be built directly on the build plate, or yet another intermediate component may be used. This may comprise a "planer tool area."

"Position"—for core methods and devices, a single-axis scalar value. As inputs to these methods and devices, and sometimes feedback from a motion control system, position and its derivatives may be a vector for multiple axes. May be signed or unsigned. See also note on term usage.

"Tool range area"—the area on or over a part surface that is available for machining, either additive or subtractive. For part surfaces that are not horizontal, or on which the machining volume is below the part surface, the meaning of the term, "over" is adjusted accordingly.

"Velocity"—for the iterative jerk method, and for a motor controller, velocity is a scalar per axis that is position per unit time. An alternative word is rate. In the context of core methods and devices, velocity does not include a heading vector because it applies to a single axis. Velocity is typically signed, but may not be. The sign, or direction, may be implied. See also note on term usage.

Ideal, Ideally, Optimum and Preferred—Use of the words, "ideal," "ideally," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," and "feature," when used in the context of describing this invention, refer specifically to various embodiments of this invention. Examples, explanations and figures using the words, "shown" or "code" refer to non-limiting embodiments. All figures are non-limiting embodiments. All descriptions herein are non-limiting, as one trained in the art will appreciate.

Claims of this invention explicitly include all combinations and sub-combinations of all features, elements, examples, claims, embodiments, tables, values, ranges, and drawings in the specification, drawings, claims and abstract. Claims of this invention explicitly include devices and systems to implement any combination of all methods described in the claims, specification and drawings. Claims of this invention explicitly include methods using devices and systems described in the claims, specification and drawings, in any combination.

We claim:

1. A method for iterative motion control comprising the steps:
   (a) accepting a first state vector comprising [p, v, a], a target vector comprising [pt, vt], and ts; wherein p, v, and a are an initial position, velocity and acceleration, respectively; pt and vt are a target position and velocity respectively and ts is an iteration time interval;
   (b) estimating tt, an arrival time interval from a current time to reach the target position pt and velocity vt;
   (c) computing j, a jerk, using the equation:

$j=-[c*(d*pt-d*p+a*tt^2+e*tt*v+tt*vt)]/tt^3;$ (d) accepting an updated p, v, and a;
(e) outputting to a motion controller any combination of (p, v, a, or j);
(f) iterating steps (c) through (e) at rate ts until an endpoint condition is reached;
wherein c, d, and e are constants;
wherein steps (a) through (f) are executed by a controller.

2. The method of claim 1 wherein:
the accepting an updated p, v, and a step comprises computing a using the equation:

$a=$[integral from 0 to $ts$ of $(j)$]$+a'$;

wherein a' is an immediately previous a.

3. The method of claim 1 wherein:
the accepting an updated p, v, and a step comprises computing v using the equation:

$v=$[integral from $t0$ to $ts$ of $(a)$]$+v'$;

wherein v' is an immediately previous v.

4. The method of claim 1 wherein:
the accepting an updated p, v, and a step comprises computing p using the equation:

$p=$[integral from $t0$ to $ts$ of $(v)$]$+p'$;

wherein p' is an immediately previous p.

5. The method of claim 1 wherein:
the accepting an updated p, v, and a step comprises accepting a real-time input from each of one or more sensors, for one or more of p, v, and a.

6. The method of claim 1 wherein:
the accepting an updated p, v, and a step comprises accepting a real-time input from a rotating shaft position sensor, for p;
wherein the motion controller is adapted to control a stepper motor; and
wherein the resolution of the sensor is at least one quarter of one step of the stepper motor.

7. The method of claim 1 wherein:
the accepting an updated p, v, and a step comprises accepting a real-time shaft position input x from a rotating shaft position sensor;
wherein the motion controller is adapted to control a stepper motor;
wherein the resolution of the sensor is at least one quarter of one step of the stepper motor; and
wherein the updated p is from a positional-correction lookup table comprising an input x and an output p.

8. The method of claim 1 wherein:
the outputting to a motion controller any combination of (p, v, a, or j) step is free of outputting p.

9. The method of claim 1 wherein:
the outputting to a motion controller any combination of (p, v, a, or j) step is free of outputting p and free of outputting v.

10. The method of claim 1, wherein the endpoint condition comprises the condition that any individual element of, or combination of: (p, v, and tt) are within a predetermined limit of the target position, the target velocity, and zero, respectively.

11. The method of claim 1, wherein:
the estimating tt step is responsive to a simulation of an execution of the method, wherein candidate tt values are altered and wherein the first state vector, the target vector, and ts, are held constant.

12. The method of claim 11, wherein:
the estimating tt step is further responsive to an optimization of a velocity curve during the simulation, such that a goal of the optimization is the velocity curve having maximum linearity.

13. The method of claim 1, wherein:
the constants c, d and e have the values 6, 4 and 3 respectively, subject to an each respective, predetermined range around values 6, 4 and 3.

14. The method of claim 13, wherein:
the each respective predetermined range is zero.

15. The method of claim 1, wherein:
the endpoint condition is responsive to any combination of:
p within a predetermined final position accuracy of p,
v within a predetermined final velocity accuracy of v,
a outside of a predetermined final acceleration range, and
j outside of a predetermined final jerk range.

16. The method of claim 1, wherein:
the motion controller controls the motion of a machine tool comprising an inverted SCARA arm.

17. The method of claim 1, comprising the additional step:
(g) computing an each estimated arrival time interval tt', for two or more axes; selecting the largest of the each tt' as the value of tt for all of the two or more axes;
wherein step (g) is performed at or before step (b).

18. The method of claim 1, wherein:
the motion controller comprises a non-linear table comprising an input a from step (e) and an output I;
wherein I is one or more coil currents in a motor controlled by the motion controller.

19. A device implementing the method of claim 1, wherein the device includes all elements of claim 1.

20. A system implementing the method of claim 1, wherein the system includes all elements of claim 1.

* * * * *